US012083549B2

(12) United States Patent
Luckow et al.

(10) Patent No.: US 12,083,549 B2
(45) **Date of Patent: *Sep. 10, 2024**

(54) DISPENSATION DEVICES AND METHODS OF MANUFACTURE AND USE THEREOF

(71) Applicant: Over The Top Foods Inc., New York, NY (US)

(72) Inventors: Tracy Luckow, Briarcliff, NY (US); Lori Gitomer, New York, NY (US); Elissa Harman, New York, NY (US); Robyn Scheck, New York, NY (US); Brent Lindberg, St. Charles, IL (US); Martin Short, South Orange, NJ (US); Robert Croft, Upper Montclair, NJ (US)

(73) Assignee: Over the Top Foods, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/087,748

(22) Filed: Dec. 22, 2022

(65) Prior Publication Data

US 2023/0131580 A1 Apr. 27, 2023

Related U.S. Application Data

(63) Continuation of application No. 17/395,159, filed on Aug. 5, 2021, now Pat. No. 11,534,781, which is a (Continued)

(51) Int. Cl.

*B65D 83/00* (2006.01)
*B05B 1/30* (2006.01)

(Continued)

(52) U.S. Cl.

CPC .............. *B05B 7/10* (2013.01); *B05B 1/3073* (2013.01); *B05B 15/16* (2018.02);

(Continued)

(58) Field of Classification Search

CPC ......... B05B 7/10; B05B 1/3073; B05B 15/16; B65D 83/0055; B65D 83/28; B65D 83/30;

(Continued)

(56) References Cited

U.S. PATENT DOCUMENTS 2,221,207 A 11/1940 Sibley
2,925,939 A 2/1960 Spero (Continued)

FOREIGN PATENT DOCUMENTS

CN 102834333 12/2012
CN 104470641 3/2015

(Continued)

OTHER PUBLICATIONS

International Search Report and Written Opinion dated Apr. 23, 2021 in related International Application PCT/US21/15385 filed Jan. 28, 2021 (11 pages).

(Continued)

*Primary Examiner* — Frederick C Nicolas
(74) *Attorney, Agent, or Firm* — Dentons US LLP

(57) ABSTRACT

This disclosure discloses various dispensation devices for dispensation of various volumes of content. For example, some of such content can include cream.

20 Claims, 13 Drawing Sheets

Related U.S. Application Data continuation of application No. 17/160,611, filed on Jan. 28, 2021, now Pat. No. 11,090,666.

(60) Provisional application No. 63/051,522, filed on Jul. 14, 2020, provisional application No. 62/967,258, filed on Jan. 29, 2020.

(51) Int. Cl.

| | |
|---|---|
| ***B05B 7/10*** | (2006.01) |
| ***B05B 15/16*** | (2018.01) |
| ***B65D 83/28*** | (2006.01) |
| ***B65D 83/30*** | (2006.01) |
| ***B65D 83/44*** | (2006.01) |
| ***B65D 83/64*** | (2006.01) |
| ***B65D 83/66*** | (2006.01) |
| ***B65D 83/68*** | (2006.01) |
| *B65D 83/46* | (2006.01) |
| *B65D 83/62* | (2006.01) |

(52) U.S. Cl.
CPC ......... *B65D 83/0055* (2013.01); *B65D 83/28* (2013.01); *B65D 83/30* (2013.01); *B65D 83/44* (2013.01); *B65D 83/66* (2013.01); *B65D 83/682* (2013.01); *B65D 83/685* (2013.01); *B65D 83/46* (2013.01); *B65D 83/62* (2013.01)

(58) Field of Classification Search
CPC ...... B65D 83/44; B65D 83/66; B65D 83/682; B65D 83/685; B65D 83/46; B65D 83/62
See application file for complete search history.

(56) References Cited

U.S. PATENT DOCUMENTS

| | | | | |
|---|---|---|---|---|
| 3,338,479 | A * | 8/1967 | Marraffino | B65D 83/685 239/303 |
| 3,341,079 | A * | 9/1967 | Marraffino | B65D 83/72 222/394 |
| 3,355,071 | A | 11/1967 | Jordan | |
| 3,726,442 | A | 4/1973 | Davidson | |
| 3,847,523 | A | 11/1974 | Parrish et al. | |
| 3,878,992 | A | 4/1975 | MacManus | |
| 3,896,971 | A | 7/1975 | Schwede | |
| 3,946,906 | A | 3/1976 | Schwede | |
| 4,061,248 | A | 12/1977 | Arena | |
| 4,189,069 | A | 2/1980 | Stoody | |
| 4,840,311 | A | 6/1989 | Shamblin | |
| 4,956,883 | A * | 9/1990 | Lane | E03C 1/046 4/615 |
| 5,071,070 | A | 12/1991 | Hardy | |
| 5,505,341 | A | 4/1996 | Gueret | |
| 5,848,729 | A | 12/1998 | Thornton | |
| D406,240 | S | 3/1999 | Guillemot | |
| 5,921,439 | A | 7/1999 | Losenno | |
| 6,230,935 | B1 | 5/2001 | Mack et al. | |
| 6,409,099 | B1 | 6/2002 | Goodwin et al. | |
| 6,607,106 | B2 | 8/2003 | Henry et al. | |
| 6,789,706 | B2 | 9/2004 | Abergel | |
| 7,191,960 | B1 | 3/2007 | Schrock et al. | |
| 8,083,103 | B2 | 12/2011 | LaFlamme et al. | |
| 8,132,696 | B2 | 3/2012 | Mileti | |
| 8,245,958 | B2 | 8/2012 | Ko | |
| 8,360,287 | B2 | 1/2013 | Ciavarella | |
| 8,800,818 | B2 | 8/2014 | Greenberg | |
| 8,859,028 | B2 | 10/2014 | Schuppan et al. | |
| 8,875,952 | B2 | 11/2014 | Ciavarella et al. | |
| 8,931,664 | B2 | 1/2015 | Foster | |
| 9,028,733 | B2 | 5/2015 | Weinstein et al. | |
| 9,272,835 | B2 * | 3/2016 | Yamada | A45D 34/042 |
| 11,090,666 | B1 | 8/2021 | Luckow | |
| 11,534,781 | B2 * | 12/2022 | Luckow | B65D 83/682 |
| 2002/0020715 | A1 | 2/2002 | Gueret | |
| 2003/0222100 | A1 | 12/2003 | Husband | |
| 2004/0011810 | A1 | 1/2004 | Mita | |
| 2004/0140326 | A1 | 7/2004 | Smart | |
| 2007/0075096 | A1 | 4/2007 | Brainard | |
| 2009/0277928 | A1 | 11/2009 | Bruckner | |
| 2010/0062096 | A1 | 3/2010 | Clauwaert | |
| 2010/0252656 | A1 | 10/2010 | Gerbron | |
| 2011/0284579 | A1 | 11/2011 | Pardes | |
| 2015/0329255 | A1 | 11/2015 | Rzepecki | |
| 2016/0249774 | A1 * | 9/2016 | Ophardt | B05B 11/1014 222/135 |

FOREIGN PATENT DOCUMENTS

| | | | |
|---|---|---|---|
| EP | 0906873 | | 4/1999 |
| EP | 0705202 | B1 | 12/1999 |
| EP | 3441324 | | 2/2019 |
| JP | S5861774 | U | 4/1983 |
| JP | S60175061 | U | 11/1985 |
| JP | 2011000531 | | 1/2011 |
| JP | 2012236628 | | 12/2012 |
| JP | 2013159356 | | 8/2013 |
| WO | WO2019073338 | | 4/2019 |
| WO | WO2019123344 | | 6/2019 |

OTHER PUBLICATIONS

China Office Action dated Sep. 15, 2023 in related application 202180025424.1 filed Jan. 28, 2021 (10 pages).
Japan Office Action dated Jul. 24, 2023 in related application 2022-546688 filed Jan. 28, 2021 (2 pages).

* cited by examiner

Preliminary Testing

In addition to being secured to a nozzle of a container, a pod can be attached to various locations within package (e.g., container, nozzle, spout, sidewall, neck, roof, top portion, middle area, handle)

DISPENSATION DEVICES AND METHODS OF MANUFACTURE AND USE THEREOF

CROSS-REFERENCE TO RELATED PATENT APPLICATIONS

This patent application is a Continuation of U.S. patent application Ser. No. 17/395,159 filed 5 Aug. 2021; which is a Continuation of U.S. patent application Ser. No. 17/160,611 filed 28 Jan. 2021, now U.S. Pat. No. 11,090,666 issued 17 Aug. 2021; which claims a benefit of U.S. Provisional Patent Application 63/051,522 filed 14 Jul. 2020 and U.S. Provisional Patent Application 62/967,258 filed 29 Jan. 2020; each of which is incorporated by reference herein for all purposes.

BACKGROUND

A user may desire to selectively vary a color, a flavor, or a texture of a whipped cream dispensable via a can. However, the user may not be able to do so because the can has a nozzle that is fixed and non-customizable. As such, the nozzle dispenses the whipped cream with a single color, flavor, or texture at a time, without allowing the user to selectively vary the color, the flavor, or the texture. Although some hair-care and oral-care products are configured to swirl a plurality of colored gels or liquids during dispensation, such technology is not known to exist for dispensing the whipped cream via the can.

SUMMARY

Generally, this disclosure enables various dispensation devices and various methods of manufacture and use thereof, which may be used in various contexts (e.g., food products, personal care products, beauty products, construction products). The dispensation devices can include various pods, bags, pouches, balloons, or other forms of containment containing a first content (e.g., a volume of matter) configured for input into a container or a nozzle containing a second content (e.g., a volume of matter) such that the first content can mix with the second content within the container or the nozzle to form a third content that is dispensed from the container or the nozzle. For example, these configurations may allow a user to selectively add, remove, modify, or vary a property (e.g., an optical property, a mechanical property, a chemical property, an electrical property, a thermal property, a color, a flavor, a texture) of the second content via the first content or vice versa.

In an embodiment, a device comprises: a container containing a first volume of matter; a nozzle including an open end portion, an inner cavity, and a sidewall, wherein the sidewall includes an opening, wherein the inner cavity is in fluid communication with the opening; and a pod including a plate, a dome, and a valve, wherein the plate hosts the valve, wherein the plate is secured to the dome, wherein the pod contains a second volume of matter between the plate and the dome, wherein the pod is secured to the sidewall such that the plate extends along the sidewall and the valve is in fluid communication with the inner cavity through the opening, wherein the second volume of matter is input into the inner cavity via the valve when the inner cavity receives the first volume of matter and the dome is compressed towards the sidewall such that the first volume of matter mixes with the second volume of matter within the inner cavity thereby forming a third volume of matter that is output from the open end portion.

In an embodiment, a device comprises: a can containing a mixture of cream and gas; a stem coupled to the can; a gasket mounted over the stem; a nozzle including a baffle and a dispensation tip, wherein the nozzle is mounted over the gasket, wherein the nozzle is in fluid communication with the can; a bag containing an agent, wherein the bag is secured to the stem, wherein the can contains the bag, wherein the mixture of cream and gas is guided to enter the gasket and the agent is guided to enter into the stem based on the stem being tilted relative to the can such that the mixture of cream and gas is mixed with the agent via the baffle and output via the dispensation tip.

In an embodiment, a device comprises: a can containing a mixture of cream and gas; a nozzle including a sidewall, an inner chamber, and a dispensation tip, wherein the sidewall includes an opening, wherein the inner chamber is in fluid communication with the opening, wherein the nozzle is in fluid communication with the can; a pod hosted via the sidewall, wherein the pod contains an agent, wherein the pod includes a valve, wherein the valve is in fluid communication with the opening, wherein the valve inputs the agent into the inner chamber based on the pod being activated while the mixture of cream and gas is in the inner chamber such that the agent is mixed with the mixture of cream and gas within the inner chamber and then output via the dispensation tip.

In an embodiment, a device comprises: a can containing a mixture of cream and gas; a base secured to the can, wherein the base includes an inner channel in fluid communication with the can; and a nozzle including a plurality of inner chambers and a plurality of dispensation tips, wherein the inner chambers are in one-to-one fluid communication with the dispensation tips, wherein the dispensation tips are geometrically different from each other, wherein the nozzle is secured to the base such that the nozzle is configured to selectively rotate relative to the base and thereby cause the inner channel to be in selective fluid communication with one of the inner chambers, wherein the mixture of cream and gas is output from one of the dispensation tips when the inner channel is in fluid communication with the one of the chambers.

In an embodiment, a device comprises: a can containing a mixture of cream and gas; a nozzle tube including a sidewall, wherein the sidewall includes a first opening; a first plate including a second opening and a third opening, wherein the first opening is coaxial with the second opening; a second plate including a fourth opening and a fifth opening, wherein the second opening is coaxial with the fourth opening and the third opening is coaxial with the fifth opening, wherein the first plate extends between the sidewall and the second plate; a first valve in fluid communication with the second opening and the fourth opening; a second valve in fluid communication with the third opening and the fifth opening; a dome secured to the sidewall such that each of the first plate and the second plate extends between the sidewall and the dome, wherein the second plate extends between the dome and the first plate, wherein the dome contains an agent, wherein the dome is deformable between a first state and a second state, wherein the agent is input into the nozzle tube through the first opening from the dome via first valve or the second valve when the dome is pressed from the first state to the second state while the mixture of cream and gas is in the nozzle tube such that the agent is mixed with the mixture of cream and gas within the nozzle tube and then output from the nozzle tube, wherein the first valve or the second valve enables the dome to return from the second state to the first state when the dome is not pressed.

In an embodiment, a device comprises: a can containing a bag and a mixture of cream and gas, wherein the bag contains an agent; a first valve secured to the can and in fluid communication with the bag; a second valve secured to the can and in fluid communication with the mixture of cream and gas; a nozzle tube having a dispensation end portion, wherein the nozzle tube contains an inner cavity extending between the can and the dispensation end portion; a wall partitioning the inner cavity into a first chamber and a second chamber, wherein the wall has a plurality of baffles extending therefrom into the first cavity, wherein the first valve inputs the agent into the first chamber and the second valve inputs the mixture of cream and gas into the first chamber and into the second chamber responsive to the nozzle tube being activated such that the baffles mix the agent with the mixture of cream and gas in the first chamber and guide the agent and the mixture of cream and gas towards the dispensation end portion in order to meet with the mixture of cream and gas from the second chamber at the dispensation end portion.

In an embodiment, a device comprises: a can containing a mixture of cream and gas; a first tubular member secured to the can and in fluid communication with the can, wherein the first tubular member includes a first wall and a plurality of leafs extending from the first wall, wherein the first wall includes an outer side having a plurality of helical projections that are spaced apart from each other and extending between the leafs and the can; a second tubular member mounted over the first tubular member, wherein the second tubular member has a second wall and a third wall, wherein the second wall has an inner side having a plurality of helical depressions that are spaced apart from each other and extending between the third wall and the can, wherein the leafs resiliently or elastically flex or bend as urged by the third wall based on the second tubular member progressively or incrementally rotating about the first tubular member via the helical projections engaging the helical depressions such that the mixture of cream and gas is controllably output between the leafs.

DETAILED DESCRIPTION OF PREFERRED EMBODIMENTS

Figure 1:
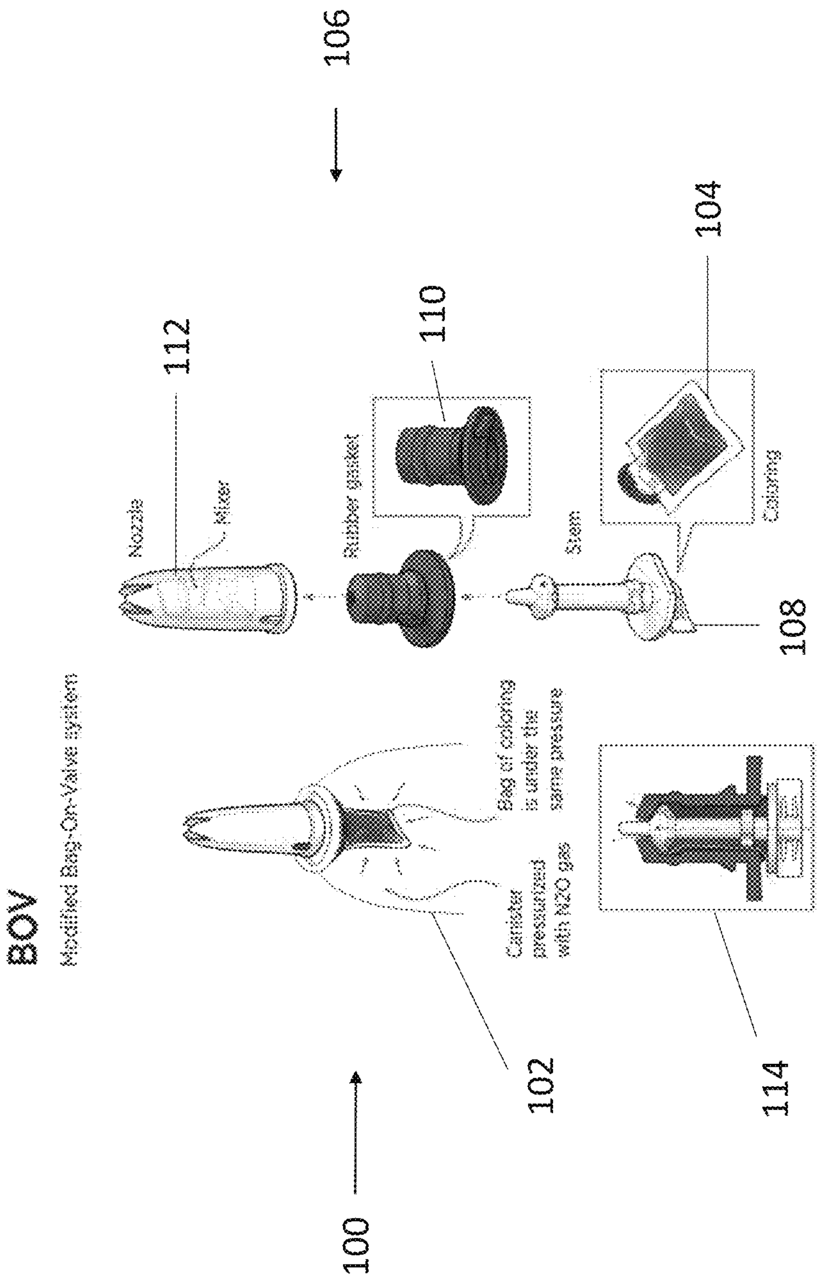
FIG. 1 shows an embodiment of a first dispenser according to this disclosure.

Generally, this disclosure discloses various dispensation devices and various methods of manufacture and use thereof. The dispensation devices can include various pods, bags, pouches, balloons, or other forms of containment containing a first content (e.g., a volume of matter) configured for input into a container or a nozzle containing a second content (e.g., a volume of matter) such that the first content can mix with the second content within the container or the nozzle to form a third content that is dispensed from the container or the nozzle. For example, these configurations may allow a user to selectively add, remove, modify, or vary a property (e.g., an optical property, a mechanical property, a chemical property, an electrical property, a thermal property, a color, a flavor, a texture) of the second content via the first content or vice versa. For example, when the dispensation device includes a pod (e.g., with a deformably resilient dome) storing the first content, where the pod is secured (e.g., removably, permanently) to a nozzle (e.g., a sidewall thereof) secured to the container, then the pod can enable micro-dosing of the first content with the second content stored in the container upon the second content being output through the nozzle. This micro-dosing can enable a customization of a good by its user by adding, removing, modifying, or varying a property of the second content (e.g., an addition of a color, an enhancement of a flavor, a change in texture), thereby providing an added value to the user. For example, the pod can snap on and off (or otherwise be removably secured) from the container or the nozzle and be replaced with a new pod (or a form of containment of a different configuration, shape, size, or content) to enable a multi-use or a reusability or a customization (although a single use is possible). For example, when the dispensation device is secured to the container or the nozzle, as disclosed herein, this form of securing can be such to ensure food safety (when fit for human or animal consumption) or minimization or absence of cross-contamination (to maximize food safety when fit for human or animal consumption). For example, these dispensation devices can be coupled (e.g., mechanically, fluidly, thermally, magnetically, friction-fit, electrically, fastenably, matingly, interlockably, removably, permanently) to containers (e.g., cans, squeezable tubes, syringes, aerosols) for dispensing fluids, liquids, gases, foams, gels, colloids, suspensions, particulates, pastes, or other volumes of matter from or into the containers or nozzles coupled to the containers (e.g., mechanically, fluidly, thermally, magnetically, friction-fit, electrically, fastenably, matingly, interlockably, removably, permanently), whether these volumes of matter are fit or not fit for human consumption, whether these volumes of matter are edible or non-edible. For example, some of these volumes of matter can include a volume of cream (or other contents disclosed herein) into which a nitrous oxide gas (or carbon dioxide or another natural or artificial gas) has been dissolved or mixed based on lipophilicity. Therefore, the volume of cream with the nitrous oxide gas may be contained under a pressure that is higher than an ambient atmospheric room pressure. As such, when the volume of cream with the nitrous oxide gas is released, expelled, guided, or otherwise output to an environment with the ambient atmospheric room pressure (e.g., via valve), the nitrous oxide gas expands and causes the volume of cream to be whipped, foamed, aerated, or appear fluffy (due to pressure reduction and bubbling or boiling of the nitrous oxide gas). This release can occur via various dispensation devices, as disclosed herein. For example, some of these dispensation devices can include adaptations to nozzles. For example, some of these dispensation devices can include adaptations to cans or valves. For example, some of these dispensation devices enable a user to selectively dispense a plurality of flavors or colors of a volume of whipped cream per use in a swirl or ribbon effect (or another geometric effect). For example, some of these dispensation devices allow a user to selectively adjust or customize how much of a coloring agent (e.g., fluid, liquid, gas, foam, gel, colloid, suspension, particulate) or a flavoring agent (e.g., fluid, liquid, gas, foam, gel, colloid, suspension, particulate) can be dispensed. For example, some of these dispensation devices allow a user to selectively adjust or customize a form of texture of a volume of whipped cream via a rotating piping nozzle, which can be similar to a decorative icing dispenser.

For example, various pods, bags, pouches, balloons, or other forms of containment, or containers (e.g., cans), as disclosed herein, can contain water-based materials, whether aqueous nonacid (e.g., cocoa, bleach) or aqueous acid (e.g., juice, cola). For example, various pods, bags, pouches, balloons, or other forms of containment, or containers (e.g., cans), as disclosed herein, can contain an aesthetic enhancer (e.g., color, flavor, aromatics, perfume, aromatherapy, air fresheners, detergents). For example, various pods, bags, pouches, balloons, or other forms of containment, or containers (e.g., cans), as disclosed herein, can contain an alcohol (e.g., a hand sanitizer, a liquid medication, an astringent for skin care, a detergent). For example, various pods, bags, pouches, balloons, or other forms of containment, or containers (e.g., cans), as disclosed herein, can contain a powder (e.g., a vitamin pack, a dry color, a dry flavor, a sweetener, a milk, a detergent). For example, various pods, bags, pouches, balloons, or other forms of containment, or containers (e.g., cans), as disclosed herein, can contain oil-based materials (e.g., fuel, cosmetics, shaving aids, cannabidiols, detergents). For example, various pods, bags, pouches, balloons, or other forms of containment, or containers (e.g., cans), as disclosed herein, can contain a functional ingredient (e.g., a vitamin, a mineral, a dietary supplement, an herbal supplement, a body building supplement, a functional enhancer, aloe, a medicinal ingredient, a pest controller). For example, various pods, bags, pouches, balloons, or other forms of containment, or containers (e.g., cans), as disclosed herein, can contain a fluid, a liquid, a gas, a gel, a paste, a foam, an adhesive, a volume of particulates, a colloid, a suspension, or other forms of matter. For example, various pods, bags, pouches, balloons, or other forms of containment, or containers (e.g., cans), as disclosed herein, can contain a cream (e.g., a dairy base, a lactose base, a non-dairy base), a water-based solution (e.g., soda), an oil-based solution (e.g., suntan lotion), a skin cream (e.g., a lotion, a moisturizer), a paint, a disinfectant, a sanitizer, a motor oil, a lubricant, a gel (e.g., shaving gel), a foam, a bleach, a pest controller, an air freshener, a glue, or other volumes of matter. Note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements.

Therefore, various example terms “below” and “lower” can encompass both an orientation of above and below.

As used herein, a term “about” or “substantially” refers to a +/−10% variation from a nominal value/term. Such variation is always included in any given value/term provided herein, whether or not such variation is specifically referred thereto.

Features described with respect to certain embodiments may be combined in or with various some embodiments in any permutational or combinatory manner. Different aspects or elements of example embodiments, as disclosed herein, may be combined in a similar manner.

Although various terms first, second, third, and so forth can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

FIG. 1 shows an embodiment of a first dispenser according to this disclosure. In particular, a first dispenser 100 includes a can 102 storing a volume of cream into which a nitrous oxide gas (or carbon dioxide or another natural or artificial gas) has been dissolved or mixed based on lipophilicity. Therefore, the volume of cream with the nitrous oxide gas may be contained within the can 102 under a pressure that is higher than an ambient atmospheric room pressure.

The first dispenser 100 employs a bag-on-valve system configured to dispense a flavoring agent (e.g., fluid, liquid, gas, foam, gel, colloid, suspension, particulate) or a coloring agent (e.g., fluid, liquid, gas, foam, gel, colloid, suspension, particulate) from the can 102, together with the volume of cream with the nitrous oxide gas, as described herein. For example, the bag-on-valve system can be configured to simultaneously dispense at least two flavoring agents or at least two coloring agents or at least one coloring agent and at least flavoring agent, together with the volume of cream with the nitrous oxide gas, as described herein.

In particular, the bag-on-valve system includes a bag 104 (or another rigid or flexible container) storing the flavoring agent or the coloring agent. The bag 104 can include plastic, metal, alloy, ceramic, shape memory, rubber, silicon, laminate film, or other suitable materials. The bag 104 is under same pressure as the volume of cream with the nitrous oxide gas within the can 102. The bag 104 cannot be removed or refilled for re-use purposes, although in some situations this may be possible (e.g., stem is selectively removable).

The bag-on-valve system includes an assembly 106 having a stem 108, a gasket 110, and a nozzle 112. The stem 108, the gasket 110, or the nozzle 108 can include plastic, metal, alloy, ceramic, shape memory, rubber, silicon, or other suitable materials. The stem 108 has a base portion and a column portion. The gasket 110 has a base portion and a tubular portion with an open end portion. The nozzle 112 includes a plurality of mixing baffles contained therein and a dispensing port downstream from the mixing baffles. Although the nozzle 112 is tubular in shape, other shapes are possible.

The bag 104 secures (e.g., fasten, mate) to the base portion of the stem 108, while the base portion of the stem 108 is in fluid communication with the volume of cream with the nitrous oxide gas stored in the can 102. As indicated by a cross-sectional view 114, the gasket 110 mounts over the stem 108 such that (a) the column portion of the stem 108 mates with the tubular portion of the gasket 110 and (b) the column portion of the stem 108 extends past the tubular portion of the gasket 110 through the open end of the tubular portion of the of the gasket 110, yet (c) not sufficiently tight or snug in order to enable fluid communication from within the tubular member to an outside of the tubular member of the gasket 110 via the open end portion of the tubular member of the gasket 110. The nozzle 112 mounts over the gasket 110 such that the open end of the tubular member of the gasket 110 is in fluid communication with the mixing baffles of the nozzle 112 and the dispensing port of the nozzle 112.

In one of mode of operation, a first type of product (red arrow) is stored in the can 102. For example, the first type of product can include a cream into which a nitrous oxide gas (or carbon dioxide or another natural or artificial gas) has been dissolved or mixed based on lipophilicity. In the bag 104, there is stored a second type of product (yellow arrow), which can be highly concentrated. The bag 104 sits below the nozzle 112 and is sealed or otherwise fluidly or mechanically connected to a valve (e.g., filament valve). The nozzle 112 is activated by tilting and unsealing the gasket 110 with respect to the stem 108. When that happens, about ½ of the first type of product draws from the can 102 (red arrow) and about ½ of the first type of product (red arrow) comingles with the second type of product (yellow arrow) stored in the bag 104 before entering the nozzle 112, being mixed via the mixing baffles, and dispensing as an orange (combination of red arrow and yellow arrow) volume of matter through the dispensation port of the nozzle 112. This dispensation enables the volume of matter, as dispensed, to have at least two different color (or flavor or texture) variations. Note that the dispensing port of the nozzle 112 outputs the volume of matter with at least two different color (or flavor or texture) variations mixed via the mixing baffles of the nozzle 112. Further, note that the nozzle 112 can be activated by pressing the nozzle 112 down towards the can 102 or the bag 104 (e.g., as a spray can, an aerosol can, a pump or plunger dispenser) relative to the can 102 or the nozzle 112 can be squeezable (e.g., collapsible tube). For example, the first type of product stored in the can 102 can include a deodorant, a paint, an oil, a hair shampoo, a hair conditioner, a soap, a liquid soap, or other contents. Note that the nozzle 112 can output co-aligned with the can 102 or diagonal or perpendicular to the can 102.

Although a 50/50 ratio is desirable for sensorial (e.g., flavor, texture, color) purposes, this is not required and this ratio can be adjusted based on how the nozzle 112 is structured. For example, there can be 75/25 ratio or 40/60 ratio or others. Although bypassing the bag 104 entirely and thereby creating a 100/0 ratio is not possible or possible but not desired, in some situations, the bag 104 can be bypassed (e.g., cease bag output via secondary valve).

The nozzle 112 can tilt within a range of preset angles (e.g., about 0 to about 90 degrees in any direction along X-Y-Z axis). As such, how the nozzle 112 is angularly tilted can affect how much or how little of one color (or flavor or texture) can be output (e.g., tilting can regulate or control degree of valve flow)

Figure 2:
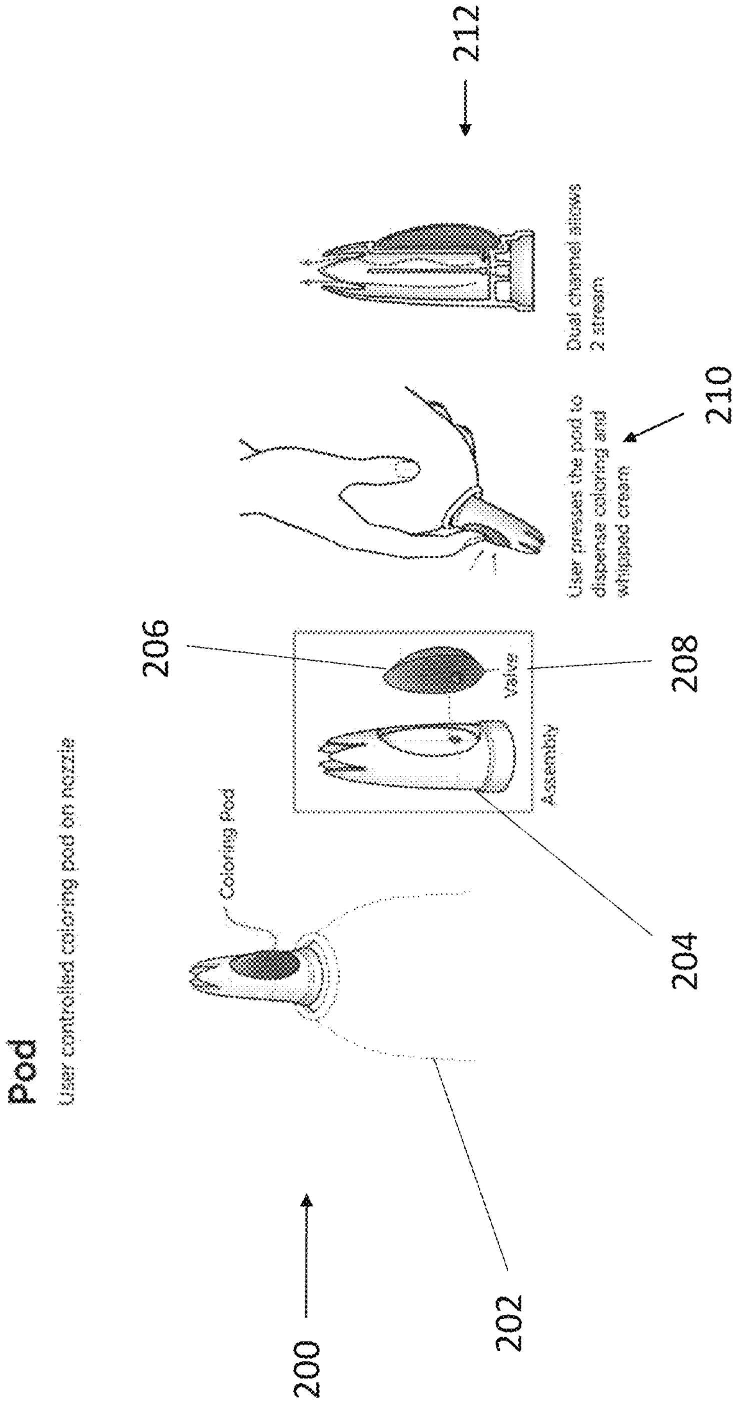
FIG. 2 shows an embodiment of a second dispenser according to this disclosure.

FIG. 2 shows an embodiment of a second dispenser according to this disclosure. In particular, a second dispenser 200 includes a can 202, which can be similar to the can 102, whether in structure, configuration, manufacture, use, or contents, as explained above. The second dispenser 200 includes a nozzle tube 204 having a dispensation port distal to the can 202, an inner cavity in fluid communication with the dispensation port and the can 102 while being positioned therebetween, and a sidewall with an opening in fluid communication with the inner cavity. As indicated by a cross-sectional view 212, the inner cavity includes a plurality of chambers, each in fluid communication with the dispensation port. The chambers can extend or can avoid extending side-by-side to each other. The sidewall includes an inward depression. The opening is formed within the depression. The nozzle tube 204 can include plastic, metal, alloy, ceramic, shape memory, rubber, silicon, or other suitable materials. Note that the nozzle tube 204 illustrative and can be shaped as a non-tube as well.

The second dispenser 200 includes a pod 206 having a valve 208 that is configured to fluidly engage the opening when the pod 206 is inserted into the inward depression such that the pod 206 snugly, frictionally, or securely rests therein. In some situations, the sidewall of the nozzle 204 contains the valve 208 and not the pod 206. The pod 206 can fasten, mate, interlock, magnetize, or otherwise secure (e.g., permanently, removably) to the sidewall via the inward depression while the valve 208 is in fluid communication with the inner cavity of the nozzle tube 204. For example, the pod 206 can be permanently secured to the sidewall or the nozzle tube 204 via fastening, mating, interlocking, adhering, molding, bonding, sonic welding, sealed with gaskets, snaps, friction-fit, or other forms of permanent securement. Likewise, the pod 206 can removably (e.g., detachably) secure to the sidewall or the nozzle tube 204 via hook-and-looping, magnetizing, snapping (on and off), fastening, mating, interlocking, friction-fit or other forms of removably attachment. The pod 206 or the valve 208 can include plastic, metal, alloy, ceramic, shape memory, rubber, silicon, laminate film, or other suitable materials. The pod 206 can contain a color agent (e.g., fluid, liquid, gas, foam, gel, colloid, suspension, particulate), a flavoring agent (e.g., fluid, liquid, gas, foam, gel, colloid, suspension, particulate), a texturizing agent (e.g., fluid, liquid, gas, foam, gel, colloid, suspension, particulate), or another agent (e.g., fluid, liquid, gas, foam, gel, colloid, suspension, particulate). The pod 206 has a dome shape, but can be shaped as a non-dome (e.g., cuboid, cube, pyramid).

In one mode of operation, the pod 206 is used to enable a dispensation of a plurality of flavoring agents, as explained above, or a plurality of coloring agents, as explained above, or a flavoring agent and a coloring agent, as explained above. The pod 206 enables a user to control and customize a coloring agent or a flavoring agent being dispensed. For example, the can 202 stores a first type of product (red arrow). The first type of product can include a cream into which a nitrous oxide gas (or carbon dioxide or another natural or artificial gas) has been dissolved or mixed based on lipophilicity. As referenced via a sketch 210, the pod 206 sits, snaps, clips, mates, fastens, interlocks, magnetizes, slides (e.g., horizontally, vertically, diagonally), or otherwise secures into place within the inward depression on the sidewall of the nozzle 204 such that the valve 208 is in fluid communication with at least one of the chambers within the inner cavity of the nozzle 204 through the opening of the sidewall of the nozzle 204. At least one of the chambers contains with the coloring agent or the flavoring agent (yellow arrow). When the pod 206 is pressed by a user, the nozzle 204 is tilted and the pod 206 contracts. Such actions dispense the coloring agent or the flavoring agent into one of the chambers (first chamber) through which the cream, into which the nitrous oxide gas has been mixed or dissolved, is being passed from the can 202, thereby resulting in an orange (combination of red arrow and yellow arrow) volume of matter being guided to the dispensation tip of the nozzle 204. While this is taking place, the first type of product (red arrow) is being guided (e.g., parallel) from the can 202 through another one of the chambers (second chamber) to the dispensation tip of the nozzle 204, without being mixed with the second type of product (yellow arrow), and being dispensed from the dispensation tip (as red arrow). Note that the pod 206 can be selectively replaced by a used based on flavor, color, or texture contents of the pod 206 to allow for multiple flavor dispensing. In some situations, a user can or cannot press the pod 206 and dispense 100% of the first type of product (red). In some situations, the nozzle 204 can host a plurality of pods 206 in order to dispense a plurality of flavoring agents, coloring agents, or texturing agents. For example, the sidewall of the nozzle 204 can host the pods 206, whether the inward depressions are present or not, whether the pods 206 are positioned side-by-side or one-over-another, whether spaced apart or immediately adjacent to each other. Further, note that the nozzle 204 can be activated by pressing the nozzle 204 down towards the can 202 (e.g., as a spray can, an aerosol can, a pump or plunger dispenser) relative to the can 202 or the nozzle 204 can be squeezable (e.g., collapsible tube). For example, the first type of product stored in the can 202 can include a deodorant, a paint, an oil, a hair shampoo, a hair conditioner, a soap, a liquid soap, or other contents. Note that the nozzle 204 can output co-aligned with the can 202 or diagonal or perpendicular to the can 202.

Figure 3:
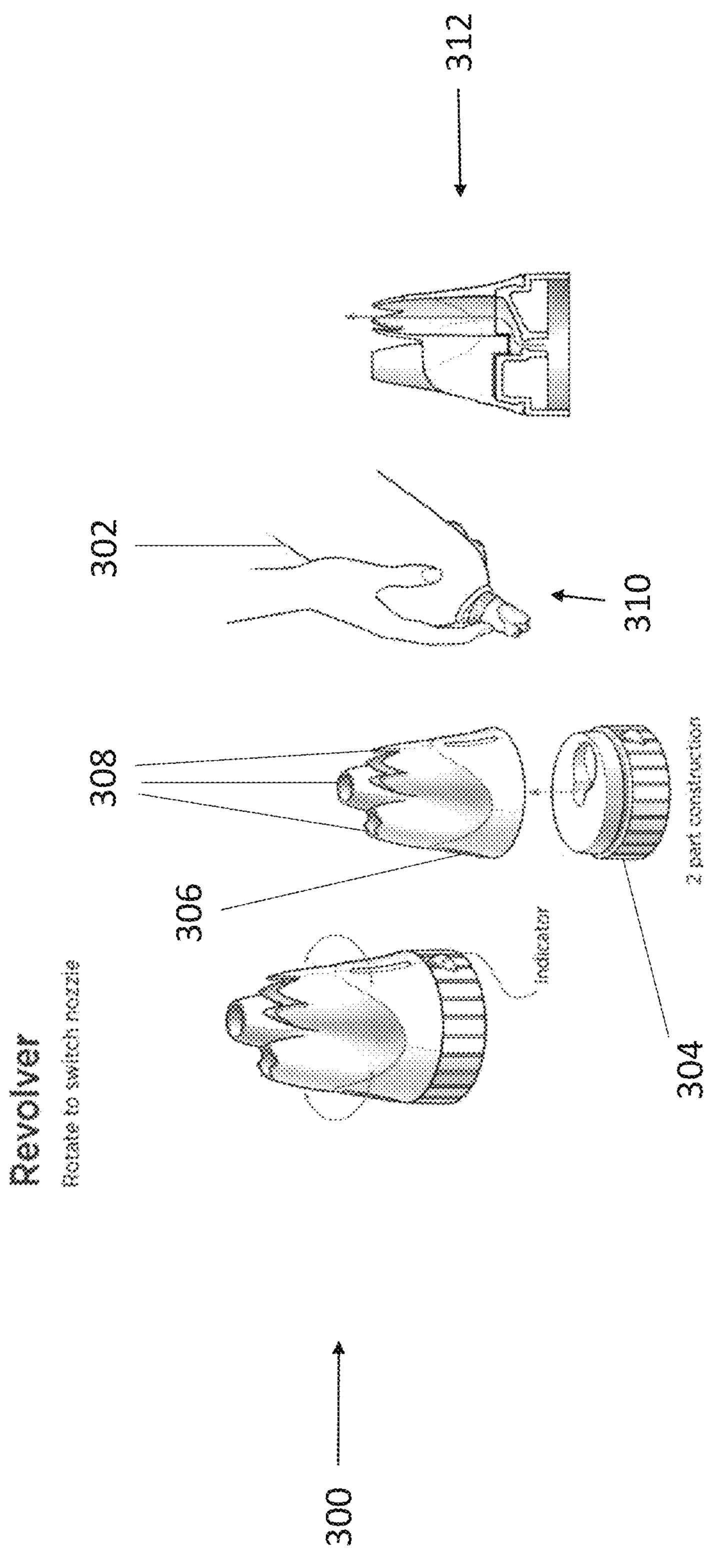
FIG. 3 shows an embodiment of a third dispenser according to this disclosure.

FIG. 3 shows an embodiment of a third dispenser according to this disclosure. In particular, a third dispenser 300 includes a can 302, which can be similar to the can 102, or the can 202, whether in structure, configuration, manufacture, use, or contents, as explained above.

The third dispenser 300 includes a base 304 and a nozzle 306. The base 304 is secured to the can 302 (e.g., fastening, mating, interlocking, magnetizing). The nozzle 306 is secured to the base 304 (e.g., fastening, mating, interlocking, magnetizing) such that the nozzle 306 is able to rotate (e.g. about vertical axis, about longitudinal axis of can) relative to the base 304 or the can 302, whether in a clockwise or a counterclockwise direction, whether freely or via a plurality of preset stations perimetrically spaced apart from each (e.g., about 15, 30, 45, 60, 90, 180 degrees). The base 304 extends between the can 302 and the nozzle 306. The base 304 or the nozzle 306 can include plastic, metal, alloy, ceramic, shape memory, rubber, silicon, or other suitable materials. The base 304 has a circular shape, but can be shaped differently (e.g., oval, square). The base 304 has an inner channel which receives a volume of content, as described herein, from the can 302.

The nozzle 306 can be activated and deactivated by tilting the nozzle 306 relative to the base 304 or the can 302 (e.g., along X-Y-Z axis), as indicated by a diagram 310. The nozzle 306 has a plurality of inner chambers and a plurality of dispensation tips 308, where the inner chambers are in fluid communication with the dispensation tips 308 in a one-to-one correspondence. Therefore, as indicated by a cross-section view 312, when the nozzle 306 is selectively rotated relative to the base 304 or the can 302, the inner channel can be selectively set to be in fluid communication with one of the dispensation 308 through one of the inner chambers. The dispensation tips 308 are geometrically structured to be different from each other (e.g. peaks, valleys, flat, arcuate, sinusoidal) in order to cause a content being dispensed therethrough (e.g., whipped cream) to have different thicknesses, shapes, textures, or other characteristics.

In one mode of operation, the third dispenser is configured to dispense a content (e.g. whipped cream) via a revolver technique in order to dispense the content in different thicknesses and shapes from the can 302, as indicated via the diagram 310. For example, the third dispenser 300 is a rotating piping nozzle assembly that allows a user to alternate between different size or shape dispensation tips 308. The nozzle 306 can rotate relative to the base 304, either in a clockwise or counterclockwise direction, to one of the preset stations (e.g. projection setting) that locks the nozzle 306 into place and allows the user to dispense the content according to a customized thickness or texture. Although the nozzle 306 is set to only dispense through one dispensation tip 308 at a time, in some situations, there could be a configuration to enable dispensing of multiple textures of the content into one container (e.g. bowl, cup) by continuing to twist and spray the content from multiple dispensation dips 308.

Note that any configurations of at least any two of the first dispenser 100, the second dispenser 200, or the third dispenser 300 can be combined. For example, the third dispenser 300 can be combined with the first dispenser 100 or the second dispenser 200. Further, the nozzle 306 or the base 304 can be detachably attachable. For example, the nozzle 306 can be detachably attached to other bases 304 on other cans 302. For example, there can be a kit including a plurality of nozzles 308 that are same or different from each other at least relative to the dispensation tips 308.

Figure 4:
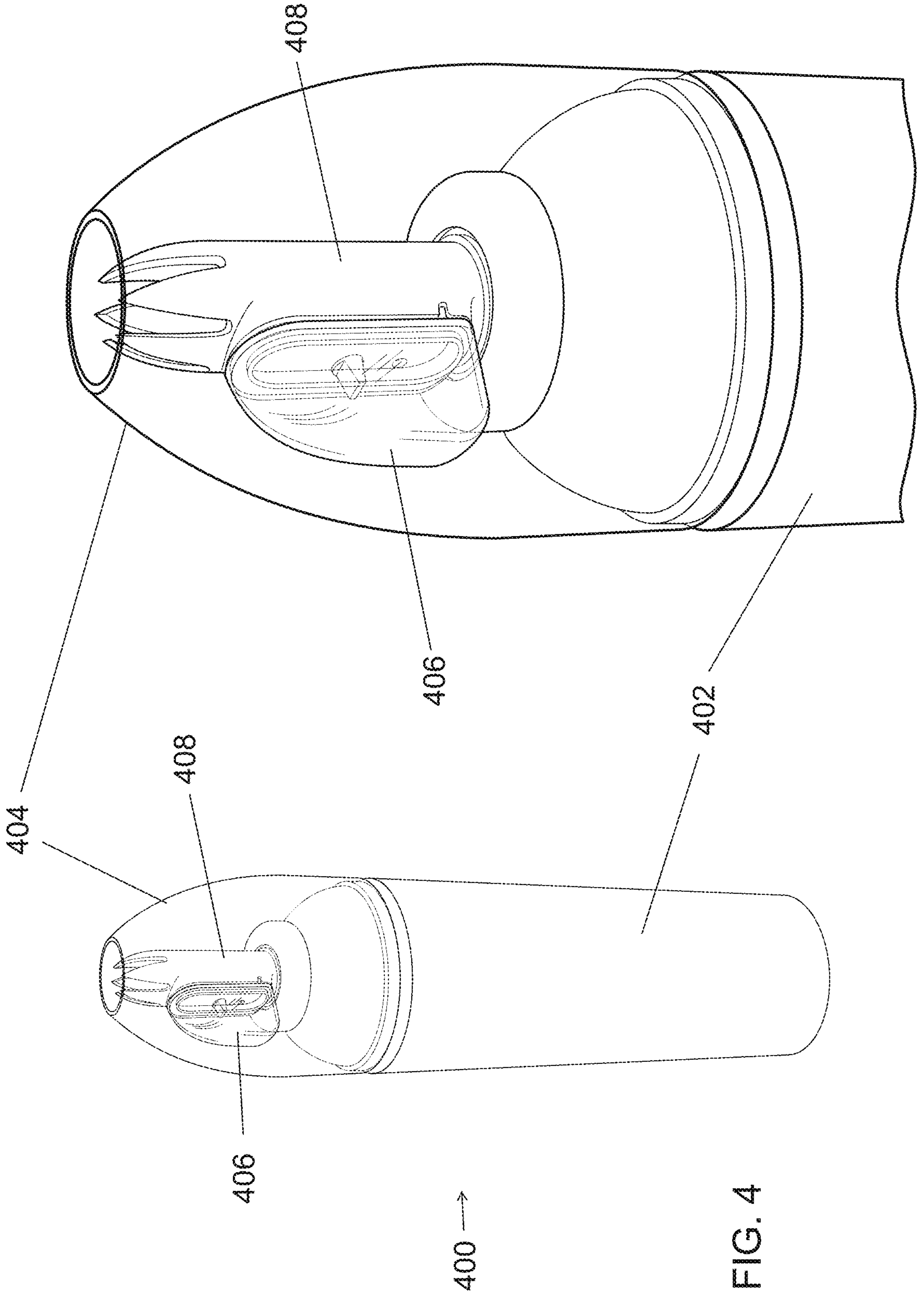
FIG. 4 shows an embodiment of a fourth dispenser according to this disclosure.

FIG. 4 shows an embodiment of a fourth dispenser according to this disclosure. In particular, a fourth dispenser 400 includes a can 402 (or another container), an overcap 404, a pod 406, a nozzle tube 408, and a ring 410. Note that the can 402, the pod 406, and the nozzle tube 408 can be respectively similar to the can 202, the pod 206, and the nozzle tube 204, whether in structure, configuration, manufacture, use, or contents, as explained above. For example, the pod 406 can be permanently secured to the sidewall or the nozzle tube 408 via fastening, mating, interlocking, adhering, molding, bonding, sonic welding, sealed with gaskets, snaps, friction-fit, or other forms of permanent securement. Likewise, the pod 406 can removably (e.g., detachably) secure to the sidewall or the nozzle tube 408 via hook-and-looping, magnetizing, snapping (on and off), fastening, mating, interlocking, friction-fit, or other forms of removable attachment.

The overcap 404 that is secured (e.g., mounted, fastened, magnetized) to the can 402 over the pod 406 such that the pod 406 is enclosed thereby. The overcap 404 is transparent, but can be translucent or opaque. The overcap 404 includes plastic, but can include other suitable materials (e.g., rubber, silicon, metal). The overcap 404 varies in width (e.g., tapered) in a direction away from the can 402 toward a blunt leading end portion (e.g., a flat base), but this configuration can vary. For example, the overcap 404 can be uniform in width (e.g., non-tapered) in the direction away from the can 402 toward the blunt leading end portion or the overcap 404 can have a pointed leading end portion. Note that the overcap 404 can be omitted.

Figure 12:
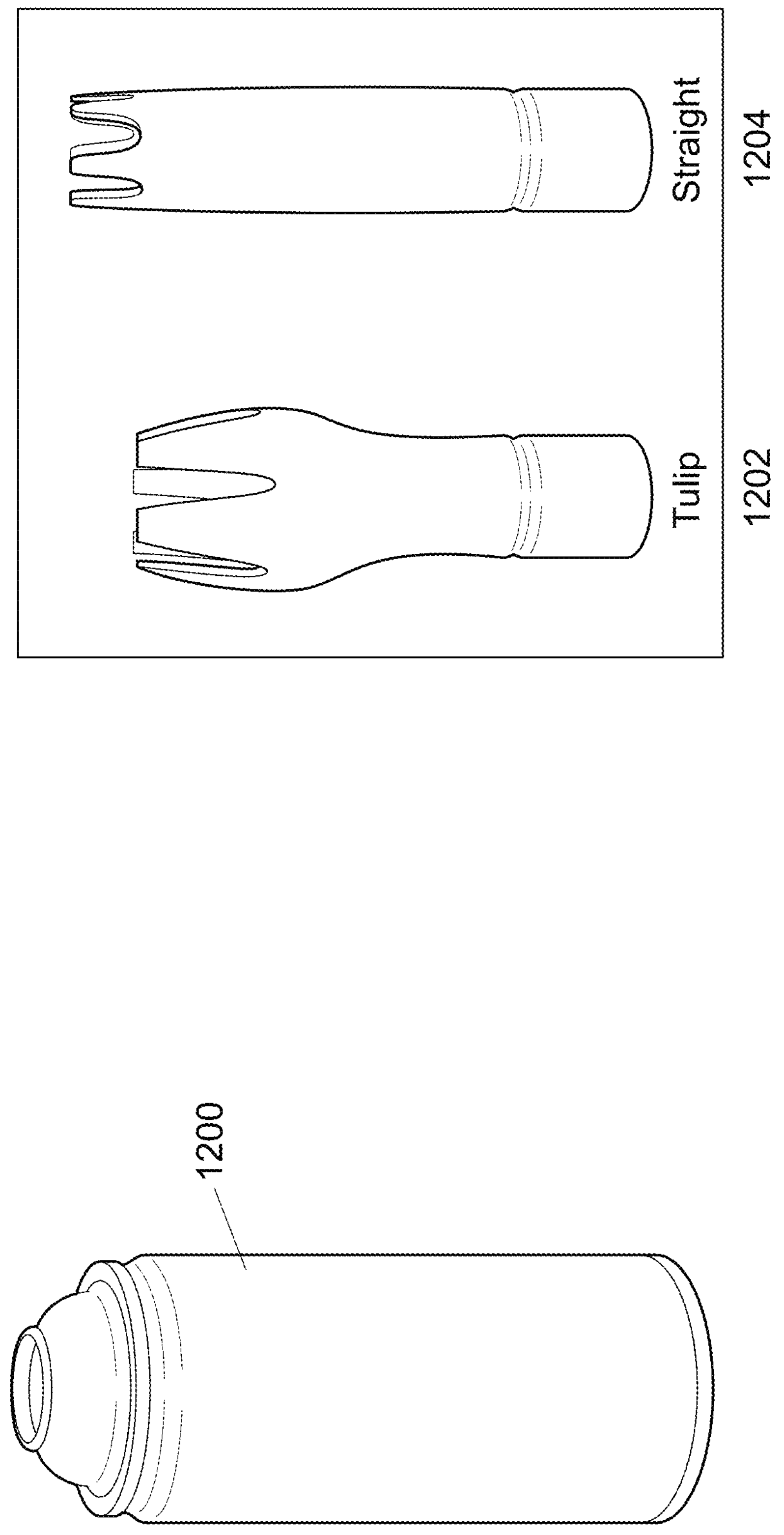
FIG. 12 shows an embodiment of a can, an embodiment of a nozzle with a dispensation tulip, and an embodiment of a nozzle having a straight shape with a dispensation crown according to this disclosure.

The pod 406 has a flat top side, a pair of sidewalls extending from the flat top side, and a back wall extending from the flat top side, where the pair of sidewalls and the flat top side converge towards a common point to form a curved frontal side. The pod 406 is transparent, but can be translucent or opaque. The pod 406 includes rubber or silicon, but can include other suitable materials (e.g., elastomer, plastic, metal, shape memory). Note that the can 402 is illustrative and other containers or forms of containment may be used. For example, FIG. 12 shows an embodiment of a can 1200 (e.g., a three piece can), an embodiment of a nozzle 1202 with a dispensation tulip, and an embodiment of a nozzle 1204 having a straight shape with a dispensation crown. As such, the can 1200 may be used for storing a mixture of cream and gas to be output as a whipped cream via the nozzle 1202 or the nozzle 1204. Likewise, note that what type, size, and shape of container or form of containment is used varies vary by industries, sectors, or use cases (e.g., haircare cans versus sunscreen cans), as would be apparent to skilled artisans. Similarly, note that what type, size, and shape of nozzles is used varies by industries, sectors, or use cases (e.g., whipped cream versus aerosol sprays). Further, note that the nozzle 408 can be activated by pressing the nozzle 408 down towards the can 402 (e.g., as a spray can, an aerosol can, a pump or plunger dispenser) relative to the can 402 or the nozzle 408 can be squeezable (e.g., collapsible tube). For example, the can 402 can store a type of product (e.g., a volume of matter) including a deodorant, a paint, an oil, a hair shampoo, a hair conditioner, a soap, a liquid soap, or other contents. Note that the nozzle 404 can output co-aligned with the can 402 or diagonal or perpendicular to the can 402.

Figure 5:
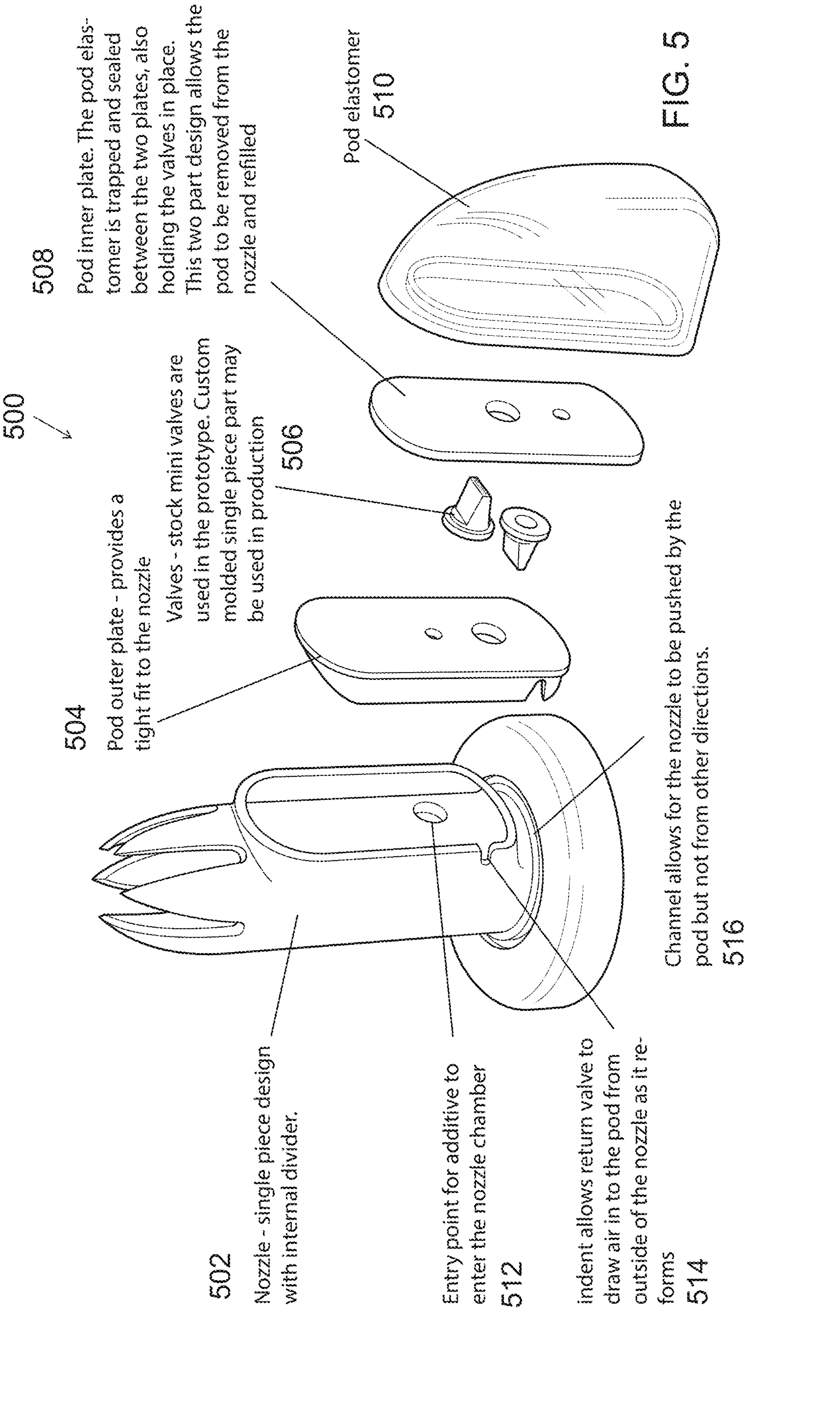
FIG. 5 shows an embodiment of a fifth dispenser according to this disclosure.

FIG. 5 shows an embodiment of a fifth dispenser according to this disclosure. In particular, a fifth dispenser includes a nozzle tube 502, a first plate 504, a plurality of valves 506, a second plate 508, and a dome 510. The nozzle tube 502 includes an opening 512, an indent 514, and a channel 516.

The first plate 504 extends between the nozzle tube 502 and the second plate 508 or the dome 510. The second plate 508 extends between the dome 510 and the first plate 504 or the nozzle tube 502.

The nozzle tube 502 is similar to the nozzle tube 402, whether in structure, configuration, manufacture, use, or contents, as explained above. However, the nozzle tube 502 has a sidewall forming the opening 512 for an agent or an additive (e.g., fluid, liquid, gas, colorizing agent, flavoring agent) to enter into the nozzle tube 502 (e.g., an internal chamber). The agent or the additive can be stored within or enclosed by the dome 510, as disclosed herein. The sidewall of the nozzle tube 502 includes a projection outwardly extending therefrom that form an indent for allowing one of the valves 506 (e.g., a return valve) to draw a fluid (e.g., liquid, gas, air) into the dome 510 from outside the dome 510 (e.g., ambient air). The nozzle tube 502 has a base from which the sidewall extends and the base forms a channel that allows the nozzle tube 502 to be laterally pushed relative to a can (e.g., the can 400) from a predetermined direction but not from other directions. For example, the nozzle tube 502 cantileveredly extends from a base (e.g., circular, square, triangular) such that the nozzle 502 can be tilted from the predetermined direction. For example, the base is unitary with the nozzle tube 502, but can be an assembly (e.g., fastening, mating, interlocking, adhering).

The first plate 504 has a sidewall depending therefrom and the projection of the nozzle tube 502 forms an area into which the sidewall of the first plate 504 extends when the first plate 504 is inserted into the nozzle tube 502. The first plate 504 has a plurality of rounded corners, but this configuration can vary (e.g., an acute corner). The first plate 504 contains a plurality of first openings, one of which is coaxial and in fluid communication with the opening 512. The first openings are not identical to each other in size but are identical to each other in shape. However, this configuration can vary where the first openings are identical to each other in size or are not identical to each in shape.

The second plate 508 corresponds in shape, area, and size to the first plate 504 such the second plate 508 can be interposed between the dome 510 and the first plate 504. The second plate 508 has a plurality of rounded corners, but this configuration can vary (e.g., an acute corner). The second plate 508 contains a plurality of second openings, one of which is coaxial and in fluid communication with the opening 512. The second openings are not identical to each other in size but are identical to each other in shape. However, this configuration can vary where the second openings are identical to each other in size or are not identical to each in shape. Note that a smaller opening of the first plate 504 is coaxial with a larger opening of the second plate 508 and a larger opening of the first plate 504 is coaxial with a smaller opening of the second plate 508.

The valves 506 can be of various suitable types, whether identical or non-identical to each other in structure or modality of operation. For example, at least one of the valves 506 can be a molded single piece. For example, the valves 506 can be unidirectional or check-valves, whether identical or non-identical to each other in structure or modality of operation. For example, at least one of the valves 506 can be a duckbill valve. For example, one of the valves 506 (e.g., a lower valve) can be configured for outputting the agent or the additive from the dome 510 and one of the valves 506 (e.g., an upper valve) can be configured for venting in order to enable the dome 510 to reform to its original or almost original configuration (e.g., shape or size). Although each of the valves 506 is shows to have a ring-shaped base and a wedge-shaped column extending the from the ring-shaped base, this structure can vary and other suitable structures or configurations can be used. Each of the valves 506 is in fluid communication with one of the first openings (e.g., smaller opening) and one of the second openings (e.g., larger opening).

Regardless of structure or modality of operation, the valves 506 enable an input of the agent or the additive (e.g., fluid, liquid, gas, colorizing agent, flavoring agent) from the dome 510 into the nozzle tube 502 based on the dome 510 being user activated (e.g., user pressed, user depressed, user compressed) and enable an input of the fluid (e.g., liquid, gas, air) into the dome 510 from outside the dome 510 (e.g., ambient air) in order to allow the dome 510 to be self-deactivated (e.g., elastically or resiliently reform back to its original or almost original shape).

The dome 510 has a flat top side, a pair of sidewalls extending from the flat top side, and a back wall extending from the flat top side, where the pair of sidewalls and the flat top side converge towards a common point to form a curved frontal side. The dome 510 is transparent, but can be translucent or opaque. The dome 510 includes rubber or silicon, but can include other suitable materials (e.g., elastomer, plastic, metal, shape memory). The dome 510 is secured (e.g., adhering, magnetizing, fastening, mating) to the nozzle tube 502 such that the dome 510 forms a seal with the nozzle tube 502 while the dome 510 internally contains the agent or the additive (e.g., fluid, liquid, gas, colorizing agent, flavoring agent). Note that the dome 510 can be permanently secured (e.g., not removable or not detachable unless the dome 510 or the nozzle tube 502 is destroyed or made inoperative) to the nozzle tube 502, or removably or detachably secured (e.g., for refilling of the agent or the additive) to the nozzle tube 502. For example, the dome 510 may have an opening with a cap (e.g., a tethered cap, a screw-on cap) through which the dome 510 may be refilled. For example, the dome 510 may be refilled via one of the valves 506.

For example, as shown in FIG. 5, the fifth dispenser 500 allows for the agent or the additive to be combined with a product (e.g., the mixture of cream and gas) within the nozzle tube 502 of the can (e.g., a pressurized aerosol can). The fifth dispenser 500 allows for the agent or the additive to be combined in such a way that at least some degree of mixing is controlled and a predetermined presentation of a final product (e.g., the agent mixed with the mixture of cream and gas) can be clearly seen. This can occur in various ways. One of such ways can occur via presenting the agent or the additive as a defined streak in the mixture of cream and gas (e.g., a volume of whipped cream).

For example, the nozzle tube 520 can output in various ways. For example, the valves 506 can be embodied as two identical or different canister or non-canister valves (e.g., a Cabot style valve, a butterfly valve, a check valve, a duckbill valve, a multi-directional valve, bi-directional valve). For example, one of such valves 506 can allow a product (e.g., the agent or the additive mixed with the mixture of cream and gas) to exit from a stem of a valve and to be pushed outwards against an internal sidewall of the nozzle tube 502. For example, one of such valves 506 can allow the product to exit vertically when there is a surface within the nozzle tube 502 extending above the an outlet of that valve 506 with between about 1 millimeter and about 2 millimeters of a gap in order to push the product sideways against the internal sidewall of the nozzle tube 502. If the product is not pushed sideways, then the product can be output directly to a dispensation end portion of the nozzle tube 502 and the agent or the additive may not be at all mixed with the product.

For example, the nozzle tube 502 can have an inner chamber that is partitioned (e.g., divided, segmented, bifurcated) by a divider (e.g., a wall) extending within the inner chamber of the nozzle tube 502, thereby splitting a stream of product roughly in half, although other proportional splits could be used, if needed. The divider ensures that a large proportion of the product does not become mixed with the additive. From experimentation, in some situations, without the divider, the agent or the additive can be pushed in to a center of the product stream and then not be seen in the product when the agent or the additive exits the nozzle tube 502. As such, note that the inner chamber within the nozzle tube 502 can be partitioned or can be not partitioned, which can depend on use case, industry, contents, or other factors.

For example, when the dome 510 is pressed (e.g., elastically or resiliently deformed), the nozzle tube 502 and a stem of one of the valves 506 can be pushed over and the product can exit through one of the valves 506. Likewise, the agent or the additive can pushed or urged through one of the valves 506 and mixes with the mixture of cream and gas from the can. Mixing can be controlled, sometimes optimally, when one the valves 506 is situated close to the base from which the nozzle tube 502 extends.

For example, the agent or the additive may have a viscosity, an output volume and an output rate be controlled by a size or a design of one of the valves 506. Although FIG. 5 shows each of the valves 506 being a duckbill valve, which can have a diameter of about 4 millimeters, other configurations. In some situations, there is a desire for at least one of the valves 506 be a unidirectional valve in order to minimize or not allow the agent or the additive to flow back into the dome 510.

For example, some headspace within the dome 510 prior to an initial use can be important as the headspace ensures that the agent or the additive does not leave to the nozzle tube 502 before dispensation, i.e., at least some air (or any other fluid or gas filling the headspace in the dome 510) is pushed out first such that an amount of the agent or the additive exits before the agent or additive begins to exit one of the valves 506 into the nozzle tube 502.

For example, one of the valves 506 vents for elastically or resiliently reforming the dome 510. Since the dome 510 can include elastic, resilient, shape memory, or elastomeric material, the dome 510 can be pressed (e.g., compressed) and depressed (e.g., inflated), where the dome 510 can naturally return to its original or almost original (e.g., within about 25% of reduction) form or shape or size or volume based on of the valves 506 (e.g., upper valve) venting into the dome 510. For example, this venting can be using the ambient air from the indent 514.

For example, the dispenser 500 can operate without a venting valve 508. In some situations, this may not allow the dome 510 to reform between uses, i.e. each time the dome 510 is pressed and the agent or the additive is dispensed, the dome 510 may be reduced in volume as the agent or the additive is pushed out. Without the venting valve, the dome 510 will remain this size and will decrease in volume each time the dome 510 is subsequently depressed until the agent or the additive is fully depleted.

For example, the valves 506 can be formed (e.g., injection molded) as one piece and even integrated into the first plate 504 or the second plate 506. Likewise, the first plate 504 and the second plate 508 can be formed (e.g., injection molded) as one piece. The dome 510 can be integrated (e.g., secured, fastened, mated, adhered, contacting) with the first plate 504 or the second plate 508. The second plate 508 or one of the valves 506 can be integrated (e.g., secured, fastened, mated, adhered, contacting) with the nozzle tube 502. The divider within the nozzle tube 502 can be formed (e.g., injection molded) separately from the nozzle tube 5020 or be attached or inserted as part of the nozzle tube 502.

For example, the fifth dispenser 500, just like any other dispenser disclosed herein, is configured for a single use as a disposable unit. However, the fifth dispenser 500 can be adapted as a reusable unit with an option of refilling the dome 510 (e.g., when the dome 510 has a lid that can be opened by detachment or pivoting an injection of the additive or the agent) or attaching new domes 510 to the nozzle tube 502, whether the dome 510 is exhausted or not (e.g., mix and match purposes).

Figure 7:
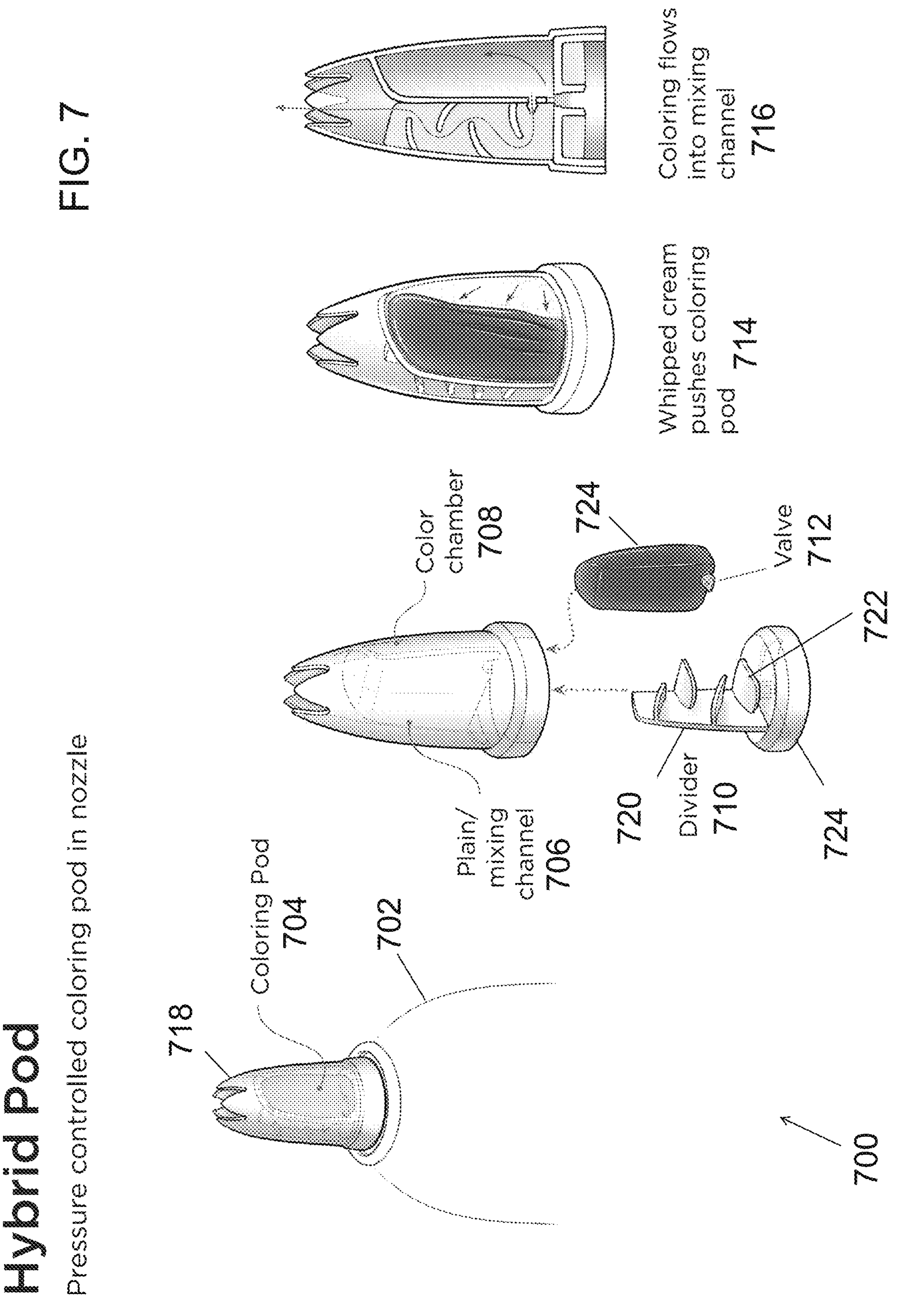
FIG. 7 shows an embodiment of a seventh dispenser according to this disclosure.
Figure 8:
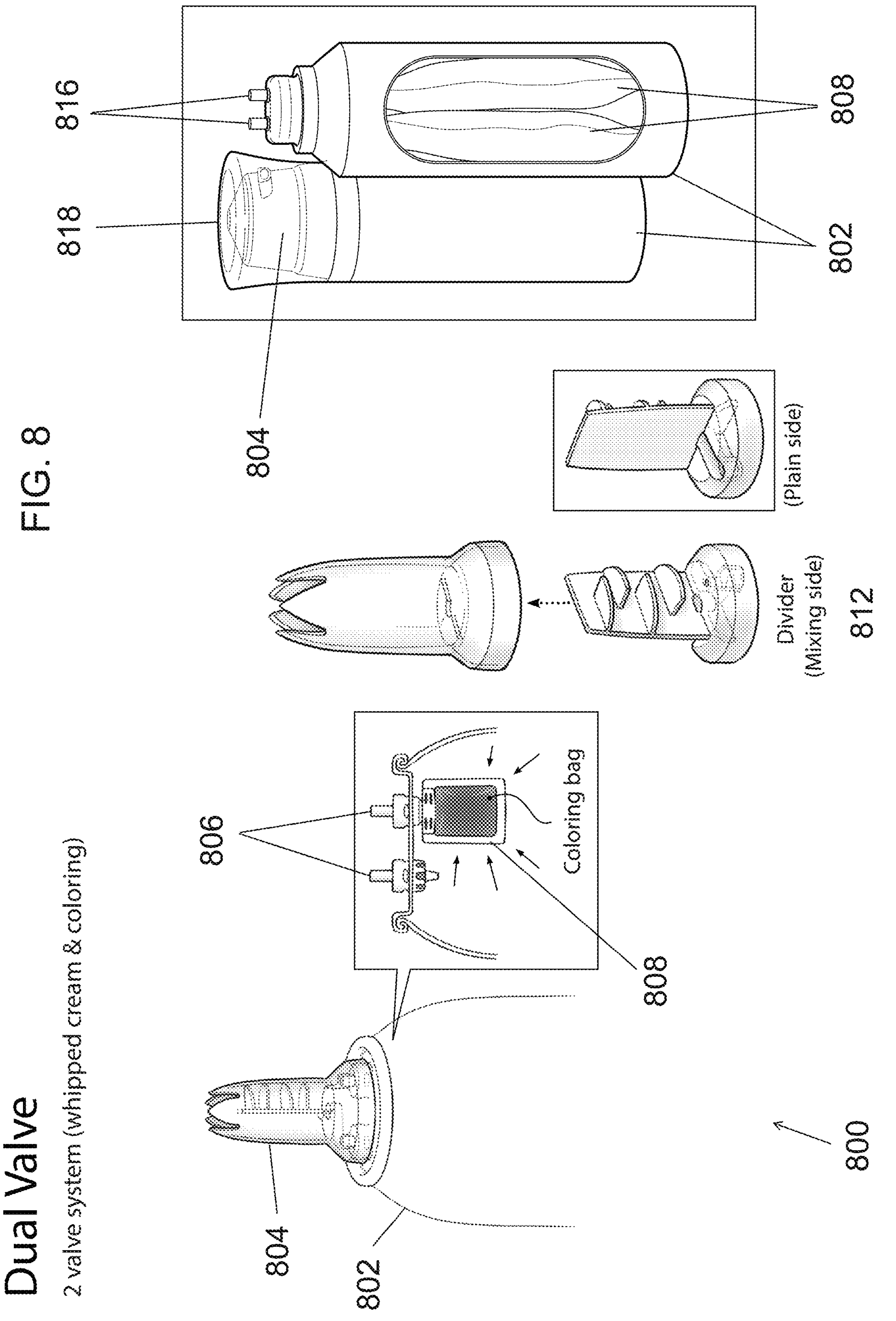
FIG. 8 shows an embodiment of an eighth dispenser according to this disclosure.
Figure 13:
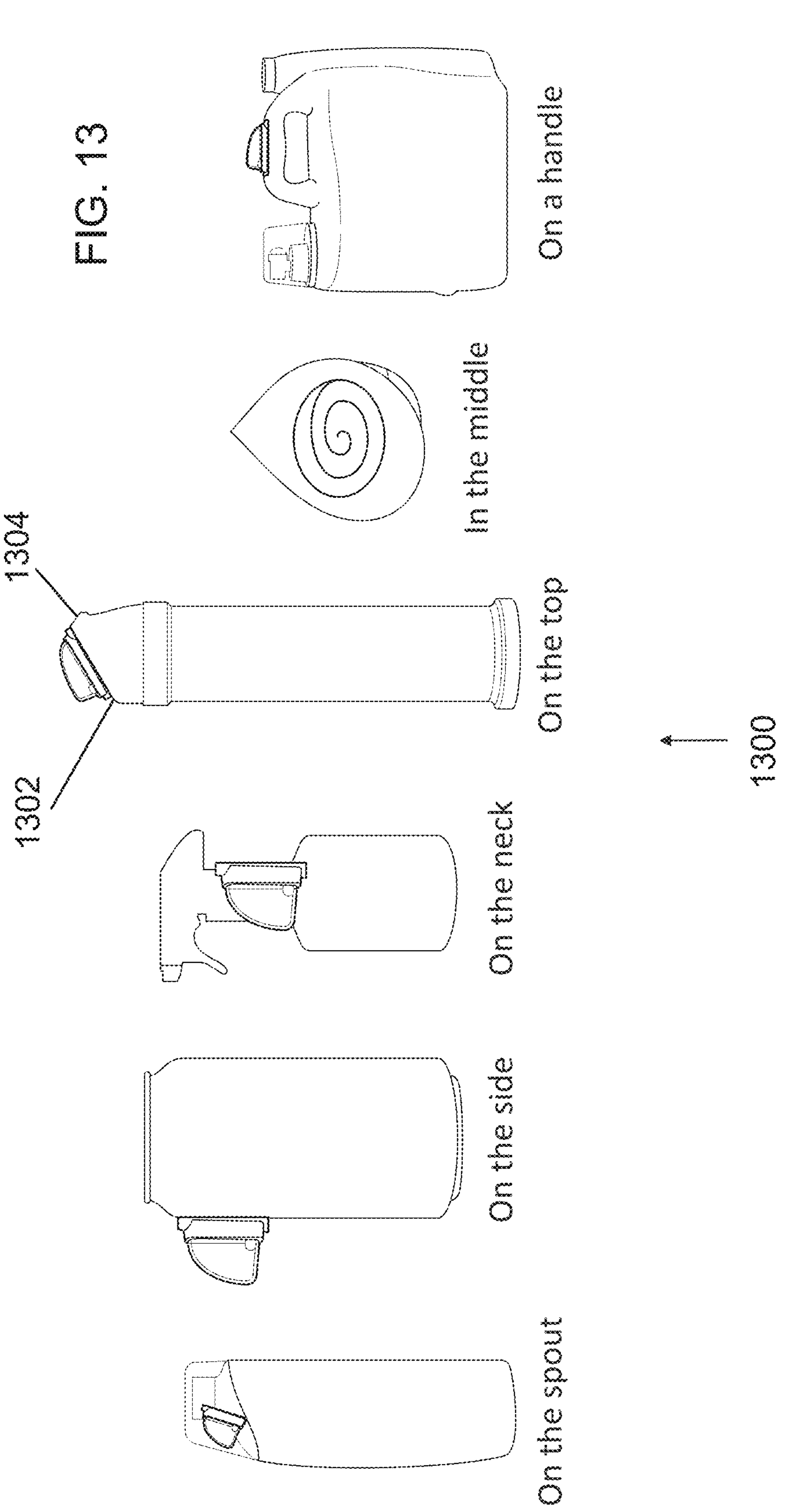
FIG. 13 shows a set of embodiments each having a pod secures in various locations according to this disclosure.

In one mode of operation, as shown in FIGS. 2, 4, 5 and others, the can 202 or 402 (or a squeezable tube or another container) can containing a first volume of matter, as disclosed herein. For example, the first volume of matter can be edible or not edible or include at least one of a fluid, a cream, an oil, a foam, a liquid, a gas, a paste, or a gel. For example, the first volume of matter can be or include a mixture of a gas and a substance, as disclosed herein. The nozzle 204, 408, or 508 includes an open end portion, an inner cavity, and a sidewall. The sidewall includes the opening 512 and the inner cavity is in fluid communication with the opening 512. The pod 206 or 406 includes the plate 508, the dome 510, and the valve 208 or 506 (e.g., a check valve, a duckbill valve). The plate 508 hosts the valve 208 or 506 and the plate 508 is secured to the dome 510. The pod 206 or 406 contains a second volume of matter, as disclosed herein, between the plate 508 and the dome 510. The pod 206 or 406 is secured to the sidewall such that the plate 508 extends along the sidewall and the valve 208 or 506 is in fluid communication with the inner cavity through the opening 512. The second volume of matter is input into the inner cavity via the valve 208 or 506 when the inner cavity receives the first volume of matter and the dome 510 is compressed towards the sidewall such that the first volume of matter mixes with the second volume of matter within the inner cavity thereby forming a third volume of matter that is output from the open end portion. The pod 206 or 406 can be removably secured (e.g., friction-fit, magnetized, fastened, mated) or permanently secured (e.g., mated, adhered, bonded, welded) to the sidewall such that the plate 508 extends along the sidewall and the valve 208 or 506 is in fluid communication with the inner cavity through the opening 512. Note that the valve can be a first valve 208 or 506 and the pod 206 or 406 can include a second valve 208 or 506 (e.g., a check valve, a duckbill valve) hosted via the plate 508, where the second valve 208 or 506 is configured to a receive a fourth volume of matter, as disclosed herein. The dome 510 can reform (e.g., resiliently, elastically, shape-memory) after being compressed in response to receiving the fourth volume of matter from the second valve 208 or 506. For example, the fourth volume of matter can include a volume of ambient air or be external to the can 202 or 402 (or another container) or the nozzle 502. For example, the second volume of matter can be configured to add, remove, or modify at least one of an optical property, a mechanical property, a chemical property, an electrical property, a thermal property, a flavor, or a texture of the first volume of matter, as disclosed herein, whether within the inner cavity or upon or after being output from the open end portion of the nozzle 204, 408, or 508. For example, the second volume of matter can be input into the inner cavity via the valve 208 or 506 when the inner cavity receives the first volume of matter based on the nozzle 204, 408, or 508 being tilted relative to the can 202 or 402 and the dome 510 is compressed (e.g., resiliently, elastically, shape-memory) towards the sidewall such that the first volume of matter mixes with the second volume of matter within the inner cavity thereby forming a third volume of matter that is output from the open end portion of the nozzle 204, 408, or 508. For example, the second volume of matter can be input into the inner cavity via the valve 208 or 506 when the inner cavity receives the first volume of matter based on the nozzle 204, 408, or 508 being pressed toward the can 202 or 402 and the dome 510 is compressed (e.g., resiliently, elastically, shape-memory) towards the sidewall such that the first volume of matter mixes with the second volume of matter within the inner cavity thereby forming a third volume of matter that is output from the open end portion of the nozzle 204, 408, or 508. As shown in FIG. 3, the open end portion can be a first open end portion and the nozzle 204, 408, or 508 (e.g., embodied as the third dispenser 300) includes a second open end portion. The nozzle 204, 408, or 508 is selectively rotatable relative to the can 202, 302, or 402 such that the third volume of matter is selectively output from at least one of the first open end portion or the second open end portion. As shown in FIG. 4, an overcap 404 (e.g., transparent, translucent, opaque) can be secured to the can 202 or 402, where the overcap encloses the nozzle 204, 408, or 508 and the pod 406 when the pod 406 is secured to the sidewall such that the plate 508 extends along the sidewall and the valve 208 or 506 is in fluid communication with the inner cavity through the opening 512. As shown in FIGS. 1, 7, and 8, the nozzle 204, 408, 804, 718, or 508 includes a baffle extending within the inner cavity. The baffle 722 mixes the first volume of matter with the second volume within the inner cavity after the second volume of matter is input into the inner cavity via the valve 208 or 506 when the inner cavity receives the first volume of matter and the dome 510 is compressed (e.g., resiliently, elastically, shape-memory) towards the sidewall thereby forming the third volume of matter that is output from the open end portion. As shown in FIGS. 2, 4, 5, 7, and 8, the can 202 or 402 and the nozzle 204, 408, or 508 are separate and distinct from each other (but can be unitary). As shown in FIG. 13, the pod 206 or 406 can be secured, as disclosed herein, in various locations (e.g., on a container, a nozzle, a spout, a sidewall, a neck, a roof 1302, a top portion, a middle area, a stationary handle, a pivotable handle) according to this disclosure. FIG. 13, also shows a dispensation port 1304. Note that the pod 206 or 406 can output its content when the nozzle 204, 408, or 508 is in an active output mode (e.g., tilted, pressed, pivoted, rotated) or in a passive output mode (e.g., cap has been removed).

Figure 6:
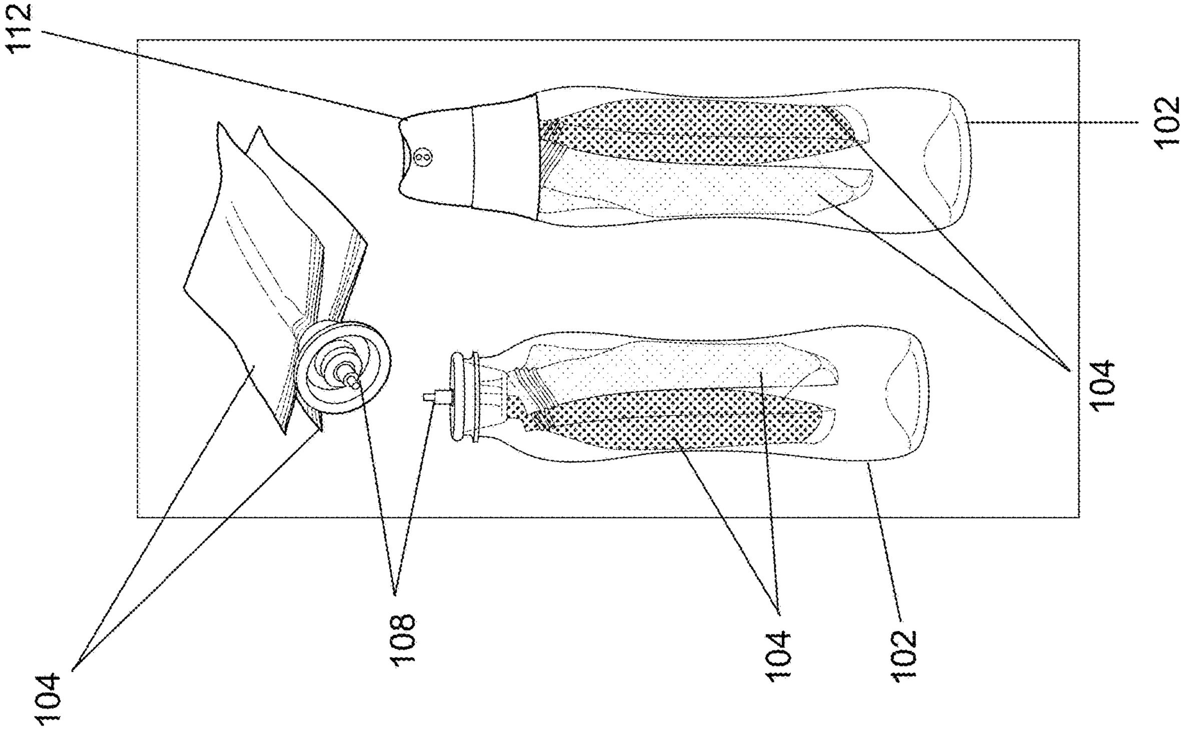
FIG. 6 shows an embodiment of a sixth dispenser according to this disclosure.

FIG. 6 shows an embodiment of a sixth dispenser according to this disclosure. In particular, a sixth dispenser 600 is similar to the first dispenser 100 whether in structure, configuration, manufacture, use, or contents, as explained above. However, the sixth dispenser has a plurality of bags 104 within the can 102, which can include a plurality of agents or additives (e.g., fluid, liquid, gas, colorizing agent, flavoring agent). The bags 104 can be identical to or non-identical each other in structure, size, shape, volume, or modality of operation. The agents or additives can be identical to or non-identical each other in structure, size, shape, volume, or modality of operation. The nozzle 112 has a sidewall through which the nozzle 112 dispenses.

FIG. 7 shows an embodiment of a seventh dispenser according to this disclosure. In particular, a seventh dispenser 700 is similar to the first dispenser 100 or the second dispenser 200 whether in structure, configuration, manufacture, use, or contents, as explained above. The seventh dispenser 700 includes a can 702, a pod 704, and a nozzle tube 718, where the nozzle tube 718 extends from the can 702. However, the pod 704 extends within the nozzle tube 718. Note that the pod 704 can be permanently secured to the sidewall or the nozzle tube 718 via fastening, mating, interlocking, adhering, molding, bonding, sonic welding, sealed with gaskets, snaps, friction-fit, or other forms of permanent securement. Likewise, the pod 704 can removably (e.g., detachably) secure to the sidewall or the nozzle tube 718 via hook-and-looping, magnetizing, snapping (on and off), fastening, mating, interlocking, friction-fit, or other forms of removable attachment.

In particular, the nozzle tube 718 has an inner cavity that hosts a divider 710 formed by a base 724 (e.g., puck shaped, cuboid, pyramidal, conical), a wall 720 (e.g., solid, not-perforated), and a plurality of baffles 722 (e.g., semi-oval shaped, rectangular shaped, square shaped, triangular shaped, pentagon shaped, hexagon shaped). The wall 720 extends from the base 724 (e.g., cantileveredly, perpendicularly, non-perpendicularly) such that the wall 720 has a first side (e.g., a mixing side) and a second side (e.g., a flat side). The baffles 722 extend from the first side of the wall 720 one over another in a step-like manner, while being vertically spaced apart from each other and also extending over the base 724. The baffles 722 can extend horizontally over the base 724, whether rectilinearly or non-rectilinearly (e.g., arcuate), whether level or sloped.

The base 724 is unitary (e.g., injection molded) with the sidewall 720, but can be an assembly (e.g., fastening, mating, adhering, magnetizing). The baffles 722 are unitary with the sidewall 720 (e.g., injection molded), but can be an assembly (e.g., fastening, mating, adhering, magnetizing). The base 724, the sidewall 720, or the baffles 722 include plastic, but can include other suitable materials (e.g., plastic, rubber, silicon, metal).

The pod 702 has a sack 724 and a valve 712, where the valve 712 extends from the sack 724 in a tail-like manner. The sack 724 contains the agent or the additive, as disclosed herein, and the valve 712 (e.g., check valve, unidirectional valve, bidirectional valve) is configured at least to output the agent or the additive from the sack 724. The sack 724 includes a resilient, elastic, shape memory, elastomeric, or another suitable material. For example, the sack 724 can include silicon or rubber. The valve 712 is unitary with the sack 724 (e.g., injection molding), but can be assembled with the sack 724 (e.g., fastening, mating, adhering, thermal bonding, magnetizing).

The second side of the sidewall 720 is configured (e.g., flat surfaced) such that the sack 724 can rest against the second side of the sidewall 720, while being opposite of the baffles 722 extending from the first side of the sidewall 720. In order to accommodate the valve 712, the sidewall 720 contains an open channel extending between the first side of the sidewall 720 and the second side of the sidewall 720. The open channel is configured to receive the valve 712 or the agent or the additive being output from the valve 712 when the valve 712 is not inside the open channel.

When the divider 710 is inserted into the inner cavity of the nozzle tube 718, the sidewall 720 partitions (e.g., segments, separates, bifurcates) the inner cavity into a first chamber 706 and a second chamber 708. The first chamber 706 is exposed to the first side of the sidewall 720 such that the baffles 722 extend therein. The second chamber 708 is exposed to the pod 702 such that that the sack 712 is contained therein. Resultantly, the open channel extends between the first chamber 706 and the second chamber 708 such that the first chamber 706 is in fluid communication with the second chamber 708 through the open channel. Note that the sidewall 720 can bend laterally such that the sidewall 720 contacts the nozzle tube 718 (e.g., an inner side) such that the sidewall 720 and the nozzle tube 718 form the second chamber 708.

In one mode of operation, the nozzle tube 718 contains the pod 704 and the divider 710 such that the second chamber 708 contains the sack 724 and the valve 712 extends or tails into the open channel extending between the first chamber 706 and the second chamber 708. When the nozzle tube 718 is laterally tilted or pushed or pulled relative to the can 702 (e.g., the user forcibly contacts the nozzle tube 718 over the second chamber 708), the sack 712 is compressed (e.g., elastically, resiliently, shape memory) and thereby urges the agent or the additive within the sack 714 to be guided or converged towards the valve 712 and be correspondingly input into the first chamber 706 through the open channel. At that point, the additive or the agent is mixed with the mixture of cream and gas via the baffles 722 and output from the nozzle tube 718. Note that the sack 724 may have a rate of compression that can correspondingly relate to a rate of output of the agent or the additive from the valve 712. For example, this corresponding relationship can be proportional, where more pressure on the sack 724 results in more of the agent or the additive being correspondingly output from the valve 712.

Note that the sidewall 720 within the nozzle tube 718 enables sufficient color dispersion and control, as disclosed herein. This can be in part because the sack 724 contains a thin liquid, as disclosed herein. However, if the sack 724 is filled with a more viscous solution (e.g., a gel in a toothpaste), then the sidewall 720 can be omitted in the seventh dispenser 700 or any other dispenser, as disclosed herein. As such, viscosity of the agent or the additive may enable the sidewall 720 being present or absent in the seventh dispenser 700 or any other dispenser, as disclosed herein.

FIG. 8 shows an embodiment of an eighth dispenser according to this disclosure. In particular, an eighth dispenser 800 is similar to the first dispenser 100, the sixth dispenser 600, or the seventh dispenser 700, whether in structure, configuration, manufacture, use, or contents, as explained above. The eighth dispenser 800 includes a can 802, a bag 808, and a nozzle tube 804, where the nozzle tube 802 has a dispensation end portion. Note that the nozzle tube 804 can output vertically or laterally. However, the eighth dispenser 800 has the can 802 hosting a plurality of valves 806 (e.g., unidirectional valves, check valves), which can be of various suitable types and can be identical or non-identical to each other, whether in structure, configuration, manufacture, use, or contents, as explained above. The valves 806 are spaced apart from each other and positioned side-by-side of each other.

The can 802 contains the mixture of cream and gas or other content, as disclosed herein. The can 802 contains the bag 808 secured thereto (e.g., fastened, mated, magnetized, thermally bonded), which can be similar to the bag 104, whether in structure, configuration, manufacture, use, or contents, as explained above. The bag 104 contains the agent or the additive, as disclosed herein. The bag 104 can contact the mixture of cream and gas or other content contained within the can 802, as disclosed herein.

One of the valves 806 (first valve 806) is in fluid communication with the bag 104. Another one of the valves 806 (second valve 806) is in fluid communication with the mixture of cream and gas or other content within the can 802, as disclosed herein. The valves 806 can be activated in parallel or in series (e.g., consecutively or sequentially). For example, the valves 806 can be activated when the nozzle tube 804 is laterally tilted or pushed or pulled or rotated (e.g., clockwise or counterclockwise) relative to the can 802.

The nozzle tube 804 has an inner cavity and contains a divider 812 therein, which can be similar to the divider 710, whether in structure, configuration, manufacture, use, or contents, as explained above. As such, the divider 812 contains a sidewall with a first side and a second side, where the first side has a plurality of baffles extending therefrom (e.g., cantileveredly) and the second side is flat, as disclosed herein. When the sidewall of the divider 812 extends within the nozzle tube 802, the sidewall partitions (e.g., segments, divides, bifurcates) the inner cavity of the nozzle tube 802 into a first chamber (e.g. a mixing chamber) and a second chamber, as disclosed herein.

In one mode of operation, the can 802 contains the first valve 806 in fluid communication with the bag 808 and the second valve 806 in fluid communication with the mixture of cream and gas or other content contained within the can 802, as disclosed herein. The nozzle tube 804 contains the sidewall of the divider 812 such that the inner cavity of the nozzle tube 802 is partitioned into the first chamber and the second chamber. When the nozzle tube 804 is rotated (e.g., clockwise or counterclockwise) or laterally tilted or pushed or pulled relative to the can 802 (e.g., the user forcibly contacts the nozzle tube 804), the first valve 806 is activated and the agent or the additive is output from the bag 808 into the first chamber. Also, whether in parallel or in series, the second valve 808 is activated and the mixture of cream and gas or other content contained within the can 802 is input into the first chamber and the second chamber. In the first chamber, the baffles cause the additive or the agent to mix with the mixture of cream and gas or other content contained within the can 802 and then be guided to the dispensation end portion. In the second chamber, the mixture of cream and gas or other content contained within the can 802 is guided toward the dispensation end portion. At the dispensation end portion, the additive or the agent mixed with the mixture of cream and gas or other content from the first chamber and the additive or the agent to mix with the mixture of cream and gas or other content from the second chamber meet, whether for further mixing purposes or output purposes at that point.

Figure 9:
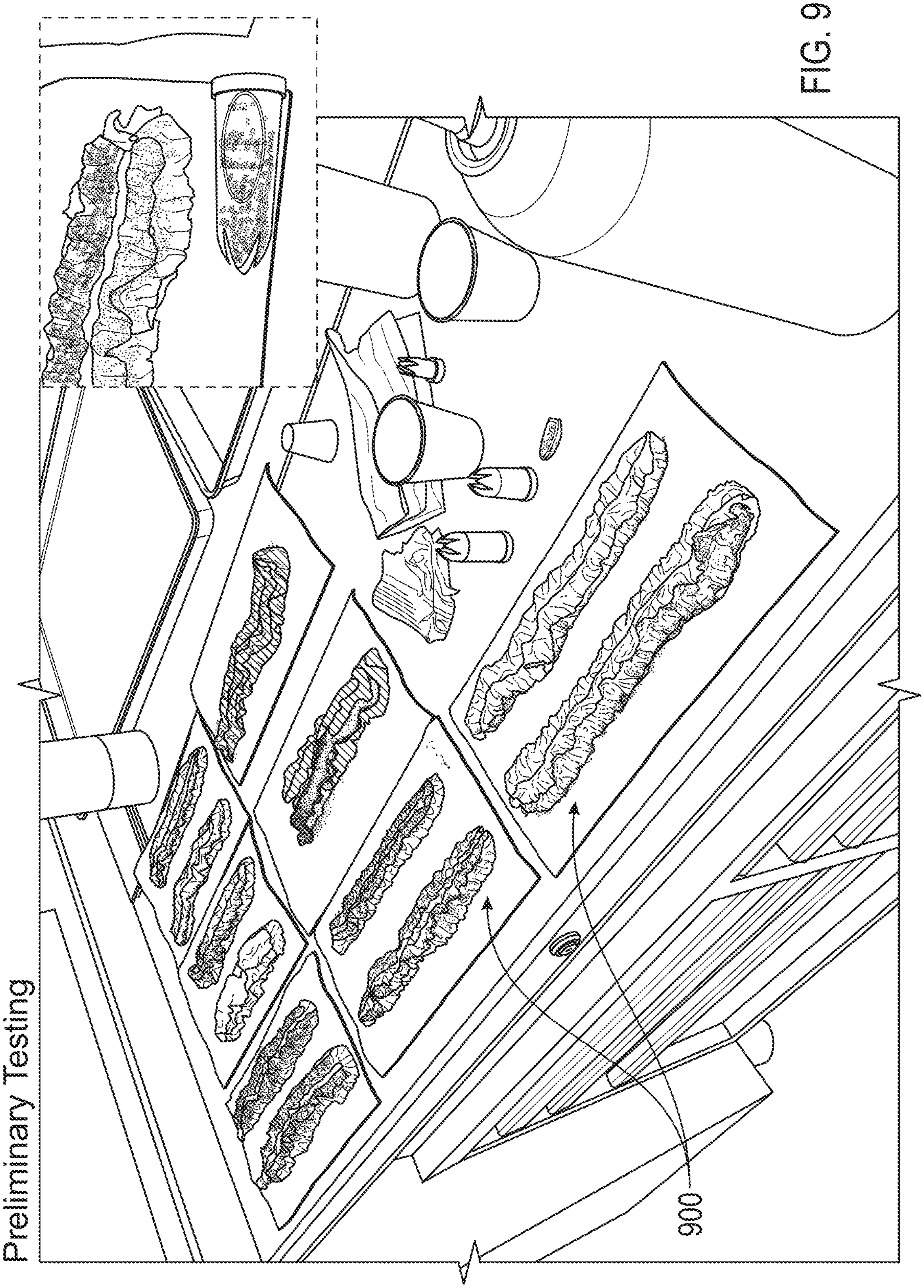
FIG. 9 shows a plurality of embodiments of a plurality of output patterns according to this disclosure.

FIG. 9 shows a plurality of embodiments of a plurality of output patterns according to this disclosure. In particular, a plurality of output patterns 900 are formed via at least one of the first dispenser 100, the second dispenser 200, the third dispenser 300, the fourth dispenser 400, the fifth dispenser 500, the sixth dispenser 600, the seventh dispenser 700, the eighth dispenser 800, or any other dispensers, as disclosed herein. For example, at least one of the output patterns 900 can include a pressurized whipped cream product which, in addition to having unique flavors, is dispensed with two colors of product simultaneously, creating a dramatic swirl of cream and color. This delivery enhances a product flavor cues and provides a unique consumer experience setting a product apart by being more fun and engaging.

Figure 10:
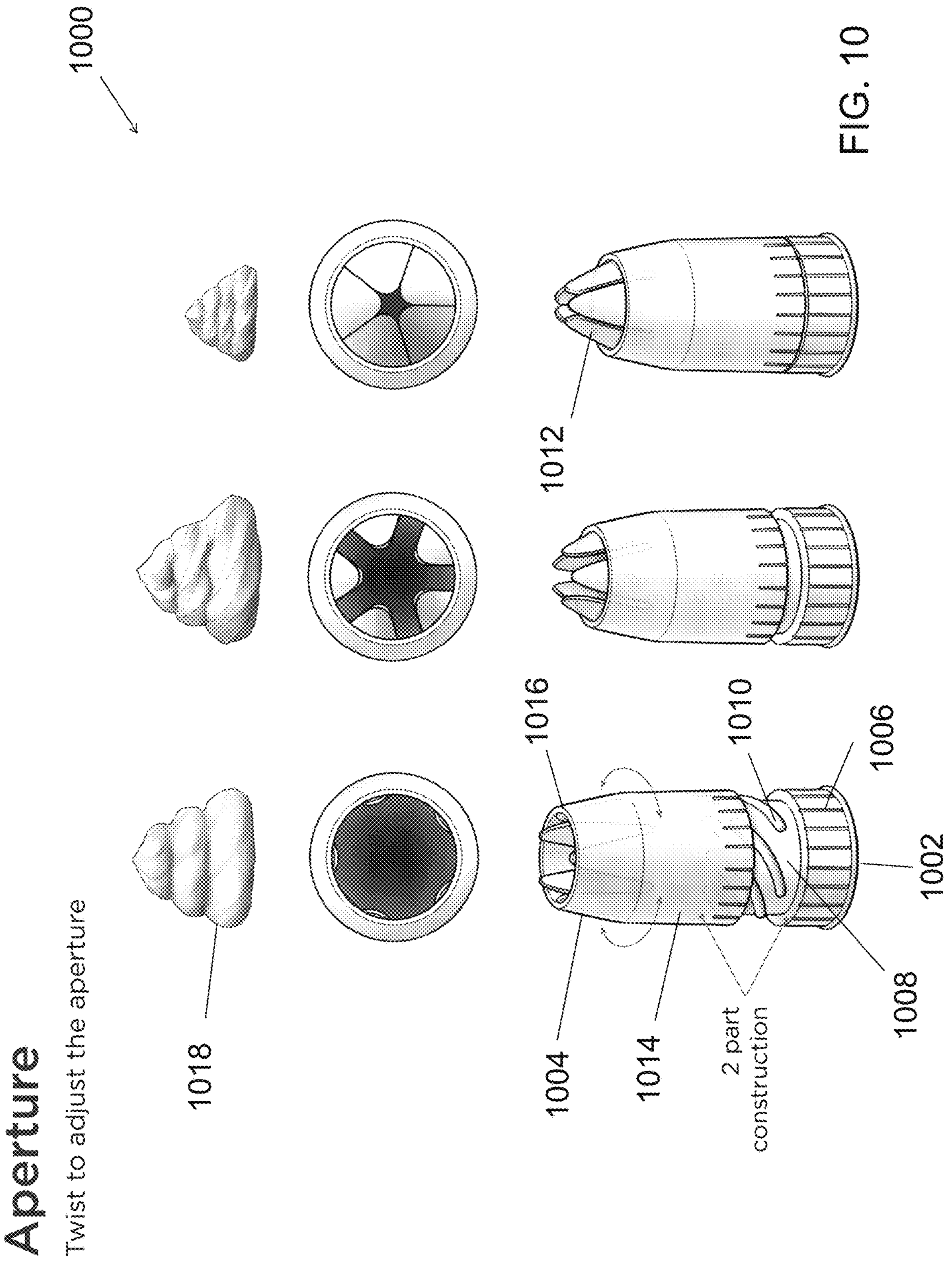
FIG. 10 shows an embodiment of a tenth dispenser according to this disclosure.

FIG. 10 shows an embodiment of a tenth dispenser according to this disclosure. In particular, a tenth dispenser 1000 includes a first tubular member 1002 and a second tubular member 1004, where the second tubular member 1004 is mounted (e.g., concentrically, nesting) onto the first tubular member 1002 such that the second tubular member 1004 can rotate, whether clockwise or counterclockwise, over the first tubular member 1002 relative to the first tubular member 1002, or vice versa. In particular, the first tubular member 1002 is secured (e.g., fastened, mounted, adhered, magnetized, thermally bonded) to a can, as disclosed herein, where the can contains a mixture of cream and gas or other contents, as disclosed herein. The first tubular member 1004 or the second tubular member 1004 includes plastic, but can include other suitable materials (e.g., metal, rubber, silicon).

The first tubular member 1002 includes a first wall 1106 (e.g., a base) extending in a closed shape (e.g., O-shape, D-shape) or an open shape (e.g., C-shape, U-shape), whether symmetrical or asymmetrical, such that the first wall 1106 encloses a first space. The first wall 1006 has a plurality of protrusions or depressions externally formed thereon for at least some enhanced grasping or gripping. When the first tubular member 1002 is secured (e.g., fastened, mated, interlocked, adhered, magnetized) to the can, then the first space is in fluid communication with the can, as disclosed herein.

The first tubular member 1002 includes a second wall 1008 extending from the first wall 1006. The second wall 1108 extending in a closed shape (e.g., O-shape, D-shape) or an open shape (e.g., C-shape, U-shape), whether symmetrical or asymmetrical, such that the second wall 1108 encloses a second space. The second space is in fluid communication with the first space. The second wall 1008 is not flush with the first wall 1006 (e.g., the first wall 1006 is diametrically or perimetrically greater or lesser than the second wall 1008). The first wall 1006 and the second wall 1008 are unitary (e.g., injection molded), but can be an assembly (e.g., fastening, mating, adhering).

The second wall 1008 has an external surface from which a plurality of protrusions 1010 extend helically about the second wall 1008 along the external surface. The protrusions 1010 are spaced apart from each other and can be in parallel to each other. The protrusions 1010 are unitary with the second wall 1008 (e.g., injection molding), but can be an assembly (e.g., adhering, fastening, mating). The second wall 1008 has a distal end portion from which a plurality of leafs 1012 extend. The leafs 1012 are unitary with the second wall 1008 (e.g., injection molding), but can be an assembly (e.g., fastening, mating, adhering). The leafs 1012 include plastic, but can include other suitable materials (e.g., elastomers, elastic materials, resilient materials, silicon, rubber, metal). The leafs 1012 are triangular in shape, but this shaping can vary (e.g., rectangular, square, semi-oval.

The leafs 1012 are configured to be resilient, elastic, or shape memory such that the leafs 1012 can bend or flex within a defined range of motion or between a plurality of positions. For example, in a default state, the leafs 1012 extend parallel to each other. In a non-default state, the leafs 102 extend non-parallel to each other and resiliently, elastically, or shape memory flex or bend towards a common center, which can be coaxial with the first wall 1006 or the second wall 1008, as disclosed herein.

The second tubular member 1004 includes a third wall 1014 and a fourth wall 1016, where the fourth wall 1016 extends from the third wall 1014 and tapers from the third wall 1014 towards the common center. The third wall 1014 and the fourth wall 1016 are unitary (e.g., injection molding), but can be an assembly (e.g., fastening, mating, adhering, magnetizing). The third wall 1014 or the fourth wall 1016 includes plastic, but can include other suitable materials (e.g., rubber, silicon, metal). The fourth wall 1016 has an open distal end portion.

The third wall 1014 has an outer side and an inner side. The outer side of the third wall 1014 has a plurality of protrusions or depressions externally formed thereon for at least some enhanced grasping or gripping. The inner side of the third wall 1014 is configured to engage or mesh (e.g., having a plurality of depressions) with the protrusions 1010 such that the second tubular member 1004 can rotate, whether clockwise or counterclockwise, over the first tubular member 1002 relative to the first tubular member 1002, or vice versa. This rotation can progressively or incrementally enable (e.g., cause) the leafs 1012 to elastically or resiliently or shape memory bend or flex towards or away from the common center. As such, when (a) the first tubular member 1002 is secured (e.g., fastened, mated, adhered, crimped, magnetized) to the can such that the first space is in fluid communication with the mixture of cream and gas or other content stored in the can and (b) the mixture of cream and gas or other content stored in the can is being output from the can through the first space and the second space towards the open distal end portion of the fourth wall 1016, then how the leafs 1012 are oriented or positioned controls what shape or size the mixture of cream and gas or other content stored takes.

For example, the second tubular member 1004 can be mounted on the first tubular member 1002 such that the protrusions or depressions of the second tubular member 1004 are immediately adjacent to the protrusions or depressions of the first tubular member 1002. When this occurs, the fourth wall 1016 urges the leafs 1012 to resiliently or elastically or shape memory bend or flex towards the common center such that the mixture of cream and gas from the can is output from an area enclosing the common center (e.g., the non-default position of the leafs 1012), as the mixture of cream and gas is sourced from the first space of the first tubular member 1002 and from the second space of the first tubular member 1002. This is shown as a rightmost swirl on FIG. 10 (smallest swirl). However, the second tubular member 1004 can be rotated counterclockwise relative to the first tubular member 1002 based on the inner side of the third wall 1014 rotationally engaging or meshing with the protrusions 1010 of the second wall 1008. When that occurs, the fourth wall 1016 progressively or incrementally allows the leafs 1012 to resiliently or elastically or shape memory bend or flex away from the common center such that the mixture of cream and gas from the can is output from the area enclosing the common center (e.g., the non-default position of the leafs 1012), as the mixture of cream and gas is sourced from the first space of the first tubular member 1002 and from the second space of the first tubular member 1002. This is shown as a middle swirl on FIG. 10 (intermediate swirl). Again, when the second tubular member 1004 is further rotated counterclockwise relative to the first tubular member 1002 based on the inner side of the third wall 1014 further rotationally engaging or meshing with the protrusions 1010 of the second wall 1008. When that occurs, the fourth wall 1016 further progressively or incrementally allows the leafs 1012 to resiliently or elastically or shape memory bend or flex away from the common center such that the mixture of cream and gas from the can is output from the area enclosing the common center (e.g., the default position of the leafs 1012), as the mixture of cream and gas is sourced from the first space of the first tubular member 1002 and from the second space of the first tubular member 1002. This is shown as a leftmost swirl on FIG. 10 (largest swirl).

Figure 11:
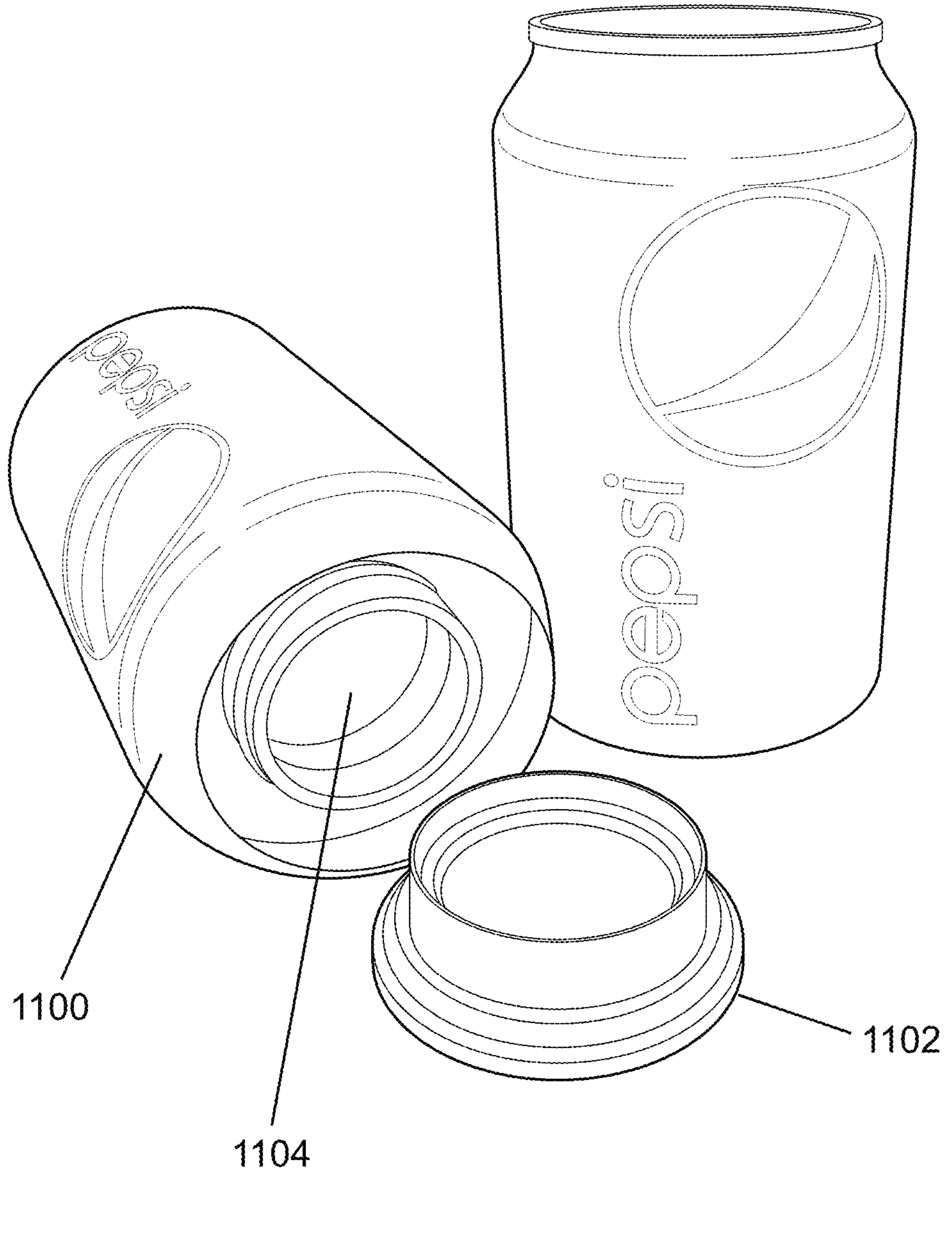
FIG. 11 shows an embodiment of a can having a compartment according to this disclosure.

FIG. 11 shows an embodiment of a can having a compartment according to this disclosure. In particular, a can 1100 may have an interior compartment 1110 and a base 1102 that is detachably attached to the can 1110 in order to control access to the interior compartment 1110. This form of detachable attachment can be embodied in various ways. For example, this form of detachable attachment can be embodied via fastening, mating, interlocking, magnetizing, or other forms of attachment. The interior compartment can store any form of good, whether in solid, gaseous, or liquid form. Some examples of such goods can include packages, pods, bags, candy, sprinkles, glitter, or other items. These may be useful on occasions when variety or heightened sensory experience that is personalized by the user is most desirable. The interior compartment 1110 can enable a customization and heterogeneity while keeping one component protected and unadulterated under pressure of a gas and a second substance stored safely without that gas pressure. For example, the can 1100 can be a fully functioning aerosol can (e.g., whip cream, toothpaste, paint, coating, adhesive, oil) with an internal partition inside the can 1100 forming the interior compartment 1110 and thereby enabling at least some concealment and protection of a secondary item within the can 1100 (false bottom) within the interior compartment 1110 that can be accessed by detaching the base 1102 (e.g., a threaded cap) from the can 1100. Therefore, on-demand, the user can detach the base 1102 from the can 1100 and add a desired quantity of a non-aerated component to a dispensed aerated product, thereby providing an enhanced sensorial experience. Note that although the interior compartment 1110 is shown on a bottom portion of the can 1100, the interior compartment 1110 can be on an upper portion of the can 1100 or between the upper portion and the bottom portion (e.g., sidewall) or within an overcap, as disclosed herein. For example, the upper portion can include a sidewall of the can 1100 or a top portion of the can 1100.

Various corresponding structures, materials, acts, and equivalents of all means or step plus function elements in various claims below are intended to include any structure, material, or act for performing the function in combination with other claimed elements as specifically claimed. Various embodiments were chosen and described in order to best disclose various principles of this disclosure and various practical applications thereof, and to enable others of ordinary skill in a pertinent art to understand this disclosure for various embodiments with various modifications as are suited to a particular use contemplated. This detailed description has been presented for various purposes of illustration and description, but is not intended to be fully exhaustive or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. Scope of this disclosure is defined by various claims, which include known equivalents and unforeseeable equivalents when filing this disclosure.

What is claimed is:

1. A method, comprising:

causing a sidewall of a nozzle of a container containing a first volume of matter to host a pod containing a second volume of matter;

causing a valve to be in fluid communication with the nozzle and the pod; and causing the second volume of matter to be input into the nozzle via the valve based on the nozzle receiving the first volume of matter such that the first volume of matter mixes with the second volume of matter within the nozzle thereby forming a third volume of matter that is output from the nozzle.

2. A method, comprising:

causing a spout of a container containing a first volume of matter to host a pod containing a second volume of matter;

causing a valve to be in fluid communication with the spout and the pod; and causing the second volume of matter to be input into the spout via the valve based on the spout receiving the first volume of matter such that the first volume of matter mixes with the second volume of matter within the spout thereby forming a third volume of matter that is output from the spout.

3. A method, comprising:

possessing a container, a nozzle, a valve, and a pod, wherein the nozzle is configured to extend from the container, wherein the nozzle is configured to host the pod, wherein the container is configured to contain a first volume of matter, wherein the pod is configured to contain a second volume of matter, wherein the valve is configured to be in fluid communication with the nozzle and the pod, wherein the nozzle is configured to output a third volume of matter based on the nozzle receiving the first volume of matter when the nozzle extends from the container and the second volume of matter via the valve when the nozzle hosts the pod such that the second volume of matter mixes with the first volume of matter to form the third volume of matter within the nozzle.

4. The method of claim 1, wherein the valve is a check valve.

5. The method of claim 1, wherein the valve is a first valve, and further comprising:

causing a second valve to be in fluid communication with the nozzle and the pod.

6. The method of claim 5, wherein the second valve is a check valve.

7. The method of claim 1, wherein the second volume of matter or the first volume of matter is not edible.

8. The method of claim 2, wherein the valve is a check valve.

9. The method of claim 2, wherein the valve is a first valve, and further comprising:

causing a second valve to be in fluid communication with the spout and the pod.

10. The method of claim 9, wherein the second valve is a check valve.

11. The method of claim 10, wherein the check valve is a duckbill valve.

12. The method of claim 2, wherein the second volume of matter or the first volume of matter is not edible.

13. The method of claim 2, wherein the second volume of matter or the first volume of matter is edible.

14. The method of claim 2, further comprising:

causing an overcap to enclose the spout and the pod.

15. The method of claim 14, wherein the overcap is transparent or translucent.

16. The method of claim 2, wherein the container is a can.

17. The method of claim 2, wherein the container is squeezable.

18. The method of claim 3, wherein the valve is a check valve.

19. The method of claim 3, wherein the valve is a first valve, and further comprising:

causing a second valve to be in fluid communication with the nozzle and the pod.

20. The method of claim 19, wherein the second valve is a check valve.

* * * * *